United States Patent
Levin et al.

(10) Patent No.: US 12,154,164 B2
(45) Date of Patent: *Nov. 26, 2024

(54) METHODS, SYSTEMS, AND NON-TRANSITORY COMPUTER READABLE MEDIUMS FOR PRODUCT CATALOG MAPPING AND INTEGRATION ACROSS DISTRIBUTED SYSTEMS AND INTERFACES, DYNAMIC DETERMINATION AND PRESENTATION OF CUSTOMIZED SERVICE OFFERS AND LIFECYCLE MANAGEMENT OF SERVICES

(71) Applicant: Extend, Inc., Covina, CA (US)

(72) Inventors: Woodrow Horwitz Levin, San Francisco, CA (US); Rohan Ajay Shah, Los Altos Hills, CA (US); Michael Ross Darmousseh, Rockwall, TX (US); Joseph Glen Moss, Danville, CA (US)

(73) Assignee: Extend, Inc., Covina, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,788

(22) Filed: Mar. 31, 2023

(65) Prior Publication Data

US 2023/0237560 A1   Jul. 27, 2023

Related U.S. Application Data

(63) Continuation-in-part of application No. 18/066,489, filed on Dec. 15, 2022.
(Continued)

(51) Int. Cl.
*G06Q 30/00* (2023.01)
*G06Q 20/12* (2012.01)
(Continued)

(52) U.S. Cl.
CPC ........ *G06Q 30/0635* (2013.01); *G06Q 20/12* (2013.01); *G06Q 30/0222* (2013.01)

(58) Field of Classification Search
CPC . G06Q 30/0635; G06Q 20/12; G06Q 30/0222
(Continued)

(56) References Cited

U.S. PATENT DOCUMENTS 7,155,409 B1 * 12/2006 Stroh ..................... G06Q 30/04
705/37
9,123,069 B1 * 9/2015 Haynes .............. G06Q 30/0625
(Continued)

OTHER PUBLICATIONS

DHgate.com partners with Square Trade to offer protection plans for all consumer electronics: Cross-border E-commerce marketplace becomes first chinese E-commerce company to offer leading consumer-rated warranties. (Oct. 27, 2014,). PR Newswire (Year: 2014).*
(Continued)

*Primary Examiner* — Arielle E Weiner
(74) *Attorney, Agent, or Firm* — Sheppard Mullin Richter & Hampton LLP

(57) ABSTRACT

Embodiments of the presently disclosed technology provide systems and methods for catalog integration across distributed systems and interfaces. Such systems and methods may comprise, for example, determining a set of product protection plan offers and a set of shipping protection plan offers to display in a live website associated with the merchant, the live website displaying the first item with a first frame object comprising the set of product protection plan offers and a second frame object comprising the set of shipping protection offers and performing an action. Certain embodiments may further provide, at the integration system, an offers management system that includes a set of connected platforms to manage aspects of the sets of protection plan offers.

20 Claims, 26 Drawing Sheets

Related U.S. Application Data

(60) Provisional application No. 63/294,654, filed on Dec. 29, 2021.

(51) Int. Cl.
  *G06Q 30/0207* (2023.01)
  *G06Q 30/0601* (2023.01)

(58) Field of Classification Search
  USPC .................................................. 705/26.81
  See application file for complete search history.

(56) References Cited

U.S. PATENT DOCUMENTS

| | | | |
|---|---|---|---|
| 2002/0188482 A1* | 12/2002 | Friend .................... | G06Q 40/02 705/4 |
| 2003/0061104 A1* | 3/2003 | Thomson ............... | G06Q 30/02 705/26.1 |
| 2008/0033821 A1 | 2/2008 | Jacobi | |
| 2008/0095441 A1 | 4/2008 | Rosskamm | |
| 2011/0161149 A1 | 6/2011 | Kaplan | |
| 2011/0225047 A1* | 9/2011 | Breed .................... | G06Q 30/02 705/14.69 |
| 2013/0013517 A1 | 1/2013 | Gallego | |
| 2014/0214456 A1 | 7/2014 | Vasavada | |
| 2015/0348282 A1* | 12/2015 | Gibbon ................. | G06Q 50/30 382/103 |
| 2016/0063564 A1* | 3/2016 | Ward .................... | G06Q 20/202 705/14.65 |
| 2018/0204281 A1* | 7/2018 | Painter ............... | G06Q 30/0641 |
| 2018/0225673 A1* | 8/2018 | Dubey .................... | G06Q 10/10 |
| 2018/0268418 A1 | 9/2018 | Tanksali | |
| 2019/0057454 A1* | 2/2019 | Komenda ............ | H04L 9/3242 |
| 2023/0037216 A1 | 2/2023 | Way | |
| 2023/0153885 A1 | 5/2023 | Mossoba | |

OTHER PUBLICATIONS

Ref U Continued: Retrieved from https://www.proquest.com/wire-feeds/dhgate-com-partners-with-squaretrade-offer/docview/1616450406/se-2 (Year: 2014).*

Clyde, "Clyde Guide", [online] [retrieved on Mar. 4, 2023], retrieved from the Internet at <URL: https://www.youtube.com/watch?v=pxPWDgzYm10>, Sep. 3, 2018, 10 pages.

Fryer, Victoria, "What Is Shipping Protection? (+ See How it Benefits Merchants and Their Consumers)", Extend, Aug. 3, 2022 (Aug. 3, 2022), Retrieved on Jun. 3, 2023 (Jun. 3, 2023) from <URL: https://www.extend.com/post/what-is-shipping-protection>, 13 pages.

Sullivan, Aaron, "How Product Protection Fits Into Your Omnichannel Customer Experience—And Improves Profitability", Extend, Nov. 28, 2022 (Nov. 28, 2022), Retrieved on Jun. 3, 2023 (Jun. 3, 2023) from <URL: https://www.extend.com/post/omnichannel-customer-experience-and-product-protection>, 11 pages.

* cited by examiner

| Enable Protection Offers | Yes ▶ |
| Balanced Cart | Yes ▶ |
| Display Cart Offers | Yes ▶ |
| Enable Refunds | Yes ▶ |

FIG. 4

| Mode (website) | ☐ Live ☐ Sandbox |
| ID (website) | |
| API Key (website) | Unique identifier for your store on the Extend platform. Go to your Extend merchant dashboard to find your StoreID and then paste or type it here. |
| | Access token which is required for all API communications between your Magneto store and the Extend platform. You can view and manage your API Key on your Extend merchant dashboard. |
| SandBox Store ID (website) | ☐ |
| SandBox API Key (website) | Unique identifier for your store on the Extend platform. Go to your Extend merchant dashboard to find your StoreID and then paste or type it here. |
| | ************ |
| | Access token which is required for all API communications between your Magneto store and the Extend platform. You can view and manage your API Key on your Extend merchant dashboard. |

Items Ordered | | | | | | | [Add Products]
---|---|---|---|---|---|---|---
Product | Price | Qty | Subtotal | Discount | Row Subtotal | Action
Maxxwave 5Vdc Switching Power Supply (10W) SKU: 05POW | $2.75 ☐Custom Price* | 1 | $2.75 | $0.00 ☑Apply | $2.75 | Please sele ▼

1510

[Add accident protection for $1.99]

▷

Items Ordered | | | | | | | [Add Products]
---|---|---|---|---|---|---|---
Product | Price | Qty | Subtotal | Discount | Row Subtotal | Action
Maxxwave 5Vdc Switching Power Supply (10W) SKU: 05POW | $2.75 ☐Custom Price* | 1 | $2.75 | $0.00 ☑Apply | $2.75 | Please sele ▼
Extend Protection Plan SKU: WARRANTY-1 | $5.49 ☑Custom Price* 5.49 | 1 | $5.49 | $0.00 ☑Apply | $5.49 | Please sele ▼
Total 2 product(s) | | | Subtotal: | $8.24 | $0.00 | $8.24

FIG. 15

Items Ordered

| Product | Item Status | Original Price | Price | Qty | Sub total | Tax Amount | Tax Percent | Discount Amount | Row Total | |
|---|---|---|---|---|---|---|---|---|---|---|
| Joust Duffle Bag SKU: 24-MB01 | Shipped | $34.00 | $34.00 | Ordered 1 Invoiced 1 Shipped 1 | $34.00 | $0.00 | 0% | $0.00 | $34.00 | |
| Extend Protection Plan SKU: WARRANTY-1 | Invoiced | $0.00 | $5.99 | Ordered 1 Invoiced 1 | $5.99 | $0.00 | 0% | $0.00 | $5.99 | Request Refund — 1710 |

FIG. 17

Your Cart

| | | Price | Quantity | Total |
|---|---|---|---|---|
| [headphones image] | Noise Cancelling Headphones - Studio Edition - White  2420A  Remove | $175  2420B | 1 | $175 |
| [shield x image] | Extend Protection Plan - 2 Year  Remove | $18.99 | 1 | $18.99 |

2410

2430A

Subtotal  $193.24

Taxes applied at checkout

Free shipping on first-time orders applied

☐ Shipping Protection by Extend
Covers lost, stolen or damaged packages
Learn More     $2.80

2430B

Continue to Checkout

METHODS, SYSTEMS, AND NON-TRANSITORY COMPUTER READABLE MEDIUMS FOR PRODUCT CATALOG MAPPING AND INTEGRATION ACROSS DISTRIBUTED SYSTEMS AND INTERFACES, DYNAMIC DETERMINATION AND PRESENTATION OF CUSTOMIZED SERVICE OFFERS AND LIFECYCLE MANAGEMENT OF SERVICES

REFERENCE TO RELATED APPLICATION

The present application is a continuation-in-part of U.S. patent application Ser. No. 18/066,489, filed Dec. 15, 2022, which claims priority to U.S. Patent Application No. 63/294,654, filed Dec. 29, 2021, which are incorporated herein by reference in their entirety.

TECHNICAL FIELD

The disclosed technology relates to technical improvements to systems for product catalog mapping and integration across distributed systems and interfaces, dynamic determination and presentation of customized service offers (e.g., product protection, shipping protection, etc.) at the point of sale, and lifecycle management of the services (e.g., including automated processing and adjudication of protection plan claims).

BACKGROUND

Merchants that sell products often sell related services. Various types of add-on services (e.g., product protection plans, shipping protection plans, etc.) for consumer product purchases are known. For many purchases, whether in person or online, the process for purchasing the service is inefficient for many reasons. This includes drawbacks due to the lack of integration between point-of-sale systems and service providers (along with other limited or ineffective technological implementations of existing systems). One problem with existing systems is the lack of information (or current information) readily accessible to merchants regarding related services that are available for a product being purchased by a given customer. The process of merchants receiving information from service providers (e.g., protection plan service providers, shipping protection plan service providers, etc.) is often not automated or not fully automated and this leads to many drawbacks.

Moreover, once a consumer purchases a service or protection plan, it is often difficult to submit a claim (e.g., a protection plan claim, a shipping protection plan claim, etc.). This, too, is due at least in part to limitations of existing technology systems. Often the protection plan is processed by a separate entity with a separate information technology system. If the protection plan service provider denies a claim, it is often difficult for a consumer to contact the protection plan service provider to dispute the claim.

For at least these reasons, the lack of technology or ineffective technology is a drawback with respect to offering and managing services that are offered to consumers in connection with product purchases.

SUMMARY

Some examples described herein relate to a technology platform for product catalog mapping (e.g., by manufacturer and/or merchant) and integration across distributed systems and interfaces, dynamic determination and presentation of customized service offers (e.g., product protection or shipping protection) related to products as part of a user work flow (e.g., as part of product search, selection and/or at the point of sale), and lifecycle management of the services (e.g., including automated processing and adjudication of protection plan claims). The system may include digitally native claim adjudication, including a multilayer chat application/bot to ensure eligibility, help file a claim by asking relevant questions (using e.g., a decision tree, AI, ML technology, or other suitable techniques), process the claim, generate automated claim approval and/or automate obtaining repair/replacement of the product for the customer.

The system includes a computer-implemented offer management system, an offers management administrative module, a rules system for storing and managing rules and processing offer rules in real-time, one or more offers APIs, a set of offer management interfaces and other technology and components as set forth herein. The Offers Management System (e.g., a computing platform comprising a processor and memory that can help create the infrastructure and platforms necessary to continuously manage protection plan and shipping offers) creates the capability to easily manage consumer pricing tests, copy, images, and design elements of offers (e.g., product protection plans, shipping services, shipping protection plans, or other plan offers) in real-time. It creates the infrastructure and platforms necessary to continuously optimize offers in real-time to maximize the benefits of the offers for the merchant, consumers and protection plan service providers. The Offers Management System includes a set of connected platforms (e.g., a set of software systems/modules and APIs communicatively/operatively connected together) to manage all aspects of Offers. It can include an Offers Management Administrative module (e.g., an interface in a merchant-accessible portion of the platform that allows the merchant to control various aspects of offers), a Rules System (e.g., a system that allows merchants and other authorized users to manage offers without the need for computer development work), an Offers API (e.g., an interface that provides customized offers to merchants from an easy to integrate module or component), a Content Management System (e.g., a system that stores strings and marketing assets for offers, including one or more templates that may be used to render offers), Lead Tokens (e.g., a unique identifier encoded with the offer that may be returned by the Offers API), an Offer Rendering system (e.g., a set of computer rules that help programmatically render frame objects or other information to a consumer device through Modal, Cart, or other user interface features during the purchase experience), and other components.

The Offers Management Administrative module includes an interface that enables interaction with the Rules System. It enables merchants and other authorized users to present relevant available services to the consumer in real time using various rules detailed below. The rules may include various factors including offer price, the merchant, product type, term length, coverage type, service type, region, subregion and/or other factors. This enables real-time dynamic offer determination and pricing.

A Rules Creator Interface enables authorized users (e.g., system administrators, merchants, and/or other authorized users) to create rules to manage all aspects of the Offer. A Rules Simulator enables authorized users to see an output, given certain inputs, as a way to check the actual output matches the expected output. A Rules Viewer Dashboard details all active and past rules and allows those rules to be edited.

The Rules System is part of the Offers Management System. It reads inputs, computes an output, and serves that output to the Offers API so that the Offer can be created in real time. The Rules Evaluator computes the rules inputted into the Rules Creator and produces an output (e.g., consumer price test, no Offer because of consumer geographic eligibility, etc.). The Offers API delivers customized Offers to merchants from an easy to integrate component. The Offers API may be configured as the delivery mechanism of the Offers Management System. The Offers API may create and return custom Offers via a token that will traverse the system. The tokens may be stored for analytical, historical, and tracking purposes. The Offers API may also serve as the method for merchants to create and update products.

The Content Management System ("CMS") is a computer-implemented service that enables various stakeholders (Product Marketing/Design) to manage offer content customization. The CMS may store a catalog of templates. Each template may represent one offer rendering. These templates may be created and approved by Design and Product Marketing and stored.

The system may use an Offer Token such that an Offer is encoded in a token that tracks or follows the consumer's purchasing workflow and is returned by the Offers API, or in the case of a purchase, the Orders API. An Offer Rendering system on the merchant's site can include outputs from the Rules Evaluator. The Offer Rendering system may comprise a set of computer rules that help programmatically render frame objects or other information to a consumer device through Modal, Cart, or other user interface features during the purchase experience.

The process may include some or all of the following steps. An entity (e.g., a merchant) integrates its web store and syncs its product catalog with the offer management system. The system maps services (e.g., product protection, shipping protection, and other protection plans) for the products. As a consumer searches, selects and/or purchases a product, the system can dynamically determine relevant offers based on various criteria (e.g., location, dynamic pricing and other factors). The offers may be presented at various points in the consumer product purchase workflow (e.g., Product Detail Page, Interstitial Modal, the Shopping Cart and other locations). If a protection plan or other add-on service is selected by the consumer, the SKU for the protection plan (or other service identifier) is added to the user's electronic shopping cart. To facilitate contract management and lifecycle management and integration in the system, whenever an order is created and invoiced that contains a service (e.g., product protection, shipping protection, etc.), the system will create a service contract in the system for that customer (e.g., a customer for a particular store). The order will contain the protection plan with the corresponding pricing based on a selected time period (e.g., 1 year, 2 year, or 3 year protection plan selected by the customer).

The system may create a data structure including key fields such as the product reference ID, the plan Id for the plan that was purchased, the customer's email address and/or other information as may be necessary or desired. The system may automatically register the protection plan (e.g., with a manufacturer or other protection plan provider) and send the customer an email with the protection plan summary and terms. When the customer has a claim, the system implements a protection plan claims adjudication component that is part of the system, including a chat application/bot to determine eligibility, gather information by asking relevant questions, facilitate automated claim approval and automatically assist in obtaining a repair/replacement of the product for the customer.

Systems, methods, and computer readable media are disclosed for implementing an integration system across distributed systems and interfaces. The integration system can provide computer-implemented components for incorporating a catalog of items with electronic protection plan offers that correspond with items. Once one or more protection plan offers are identified for an item, visual representations of the protection plan offers may be integrated as frame object components at a network document (e.g., webpage) associated with a merchant system from the integration system that is remote from the merchant system.

Some aspects of examples described herein relate to technical improvements to various aspects of the foregoing system. Some of these technical improvements include enhanced technology for dynamic claims adjudication, where a bot is configured to dynamically adjudicate a claim via the ability to configure different questions/response paths for adjudicating claims via the chatbot and/or internal claims administrator tools (e.g., for customer service agents taking claims via phone) and/or merchant claims admin tools. Customizations may be configured manually on the system and then automatically served when a claim is initiated for different protection plans.

Another technical improvement includes dynamic messaging in offers. Rather than provide static offer messages, the offer system can be configured to customize the text in protection plan offers and info pages for different product categories or merchants. Customizations may be configured manually on the system and then automatically served when an offer is displayed in different merchant stores.

Another technical improvement includes a merchant agent claims portal where merchant customer service agents can log into a portal and be automatically guided through an online form to process a claim. The form may dynamically display correct question/response flow for that merchant/protection plan.

Another technical improvement includes real-time automated product protection plan mapping, including the ability to map a product not previously known to the offer management system to a protection plan at the time of product protection plan offer, based on product category information and/or machine learning models involving other product data. In some examples, a machine learning (ML) model may be implemented for product catalog protection mapping.

Another technical improvement includes technology to provide and manage multiple services via order data. Historically, a merchant would have separate integration points to report a protection plan sale to the offer management system (e.g., via the Create Contract API), report a sale of a protectable item without a protection plan (e.g., via the Create Lead API), cancel a contract (e.g., via a Refund API), and to create or update products on the offer management system, where the services all related to a particular service (e.g., a protection service). An improved orders API is configured to enable merchants to report the contents of a customer order and the offer management system can support the order by providing, for example, protection plan creation, lead creation, product creation and updates, protection plan cancellation/refunds, handling for products that are shipped much later than the order date (which affects protection plan coverage dates), shipping protection sales, offer management system managed OEM protection plan services, returns management, and other post-purchase services.

Another technical improvement includes a dynamic offers rules engine which is configured to enable authorized users to create and store rules for controlling what coverages are offered and how they are priced, messaged, and displayed. This enables testing and optimization and can satisfy merchant-specific rules.

Another technical improvement includes a multi-tenancy management component which is configured to enable related entity management (e.g., a parent merchant with child stores) in the same account on a protection plan technology platform (i.e., centrally managed system, but each store has discrete products and protection plan programs).

The integration system may also implement a chatbot at a network document (e.g., webpage) associated with the merchant system. The chatbot receives questions and provides answers by following a pre-determined decision tree of questions and inputs based on protection plans, merchant information, and product information. For example, the chatbot may assist a consumer user by answering questions or providing information about one or more protection plan offers for an item. In another example, the chatbot may configure different question and response paths for adjudicating claims for the consumer user, an internal claims administrative user (e.g., for customer service agents taking claims via phone), or merchant claims administration tool.

The integration system may also implement a contract management engine to customize text in protection plan offers and information pages at the network document. The information may provide descriptions of items or merchants, item categories, or other relevant information about protection plan offers for consumer users. The contract management engine can provide text to the network document that is manually entered by an administrative user and/or automatically provide the information when a protection plan offer is displayed.

The integration system may also implement a lead token engine to identify that an item was purchased without a corresponding protection plan offer. The lead token may identify a consumer user to contact after a purchase of the item to follow up with another offer to acquire a protection plan.

The integration system may also implement an administration module to provide information for administrative and merchant users. For example, a merchant customer service agent can log into an interface of the integration system and be walked through an online form that teaches the agent how to determine information to generate a claim. The interface may dynamically display a correct question and response flow for a particular merchant or protection plan (e.g., based on a decision tree, a trained ML model or other suitable techniques). For example, the interface may identify a customer and a protection plan about which the customer is filing a claim using the provided information. Once the protection plan contract is identified, the interface can look up a correct decision tree to use. The decision trees may be generally associated with a protection plan, but there can be decision tree branches that are specific to a merchant or product category. The interface can then walk the customer through a series of questions and customer inputs based on the selected decision tree. Here the customer's path through the decision tree may differ based on customer inputs. For example, in a furniture claim, one question in the decision tree may be whether the damage is a tear or a stain, and if the customer selects "stain" then the next question will be about the type of stain.

The integration system may also provide real-time automated mapping between a protection plan offer and an item. For example, the system may have the ability to map an item not previously stored in an item catalog data store and map the item to a protection plan offer in real-time. The mapping may be based on item category information and/or a trained ML model involving other item data.

The integration system may also implement an action engine to provide one or more services (e.g., using order data, protection plan offer information, or consumer user information). For example, the system may initiate support for merchants by creating a protection plan based on a purchased protection plan offer, create a lead token associated with a potential future consumer, create items with corresponding information, cancel or update protection plan offers, initialize a refund process, update protection coverage dates based on delayed shipping timelines from the order date, generate a shipping protection order, and initiate original equipment manufacturer (OEM) protection plan services, returns management, or other post-purchase services.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 4 illustrates a configuration interface, in accordance with the embodiments disclosed herein.

FIG. 5 illustrates an authentication interface, in accordance with the embodiments disclosed herein.

FIG. 12 illustrates an example of a network document associated with a merchant system, in accordance with the embodiments disclosed herein.

FIG. 15 illustrates manually adding a protection plan offer to an item order, in accordance with the embodiments disclosed herein.

FIG. 17 illustrates an interface for initiating a return process, in accordance with the embodiments disclosed herein.

FIG. 24 illustrates an example of a network document associated with a merchant system, in accordance with the embodiments disclosed herein.

FIG. 25 illustrates an example of a network document associated with a merchant system, in accordance with the embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
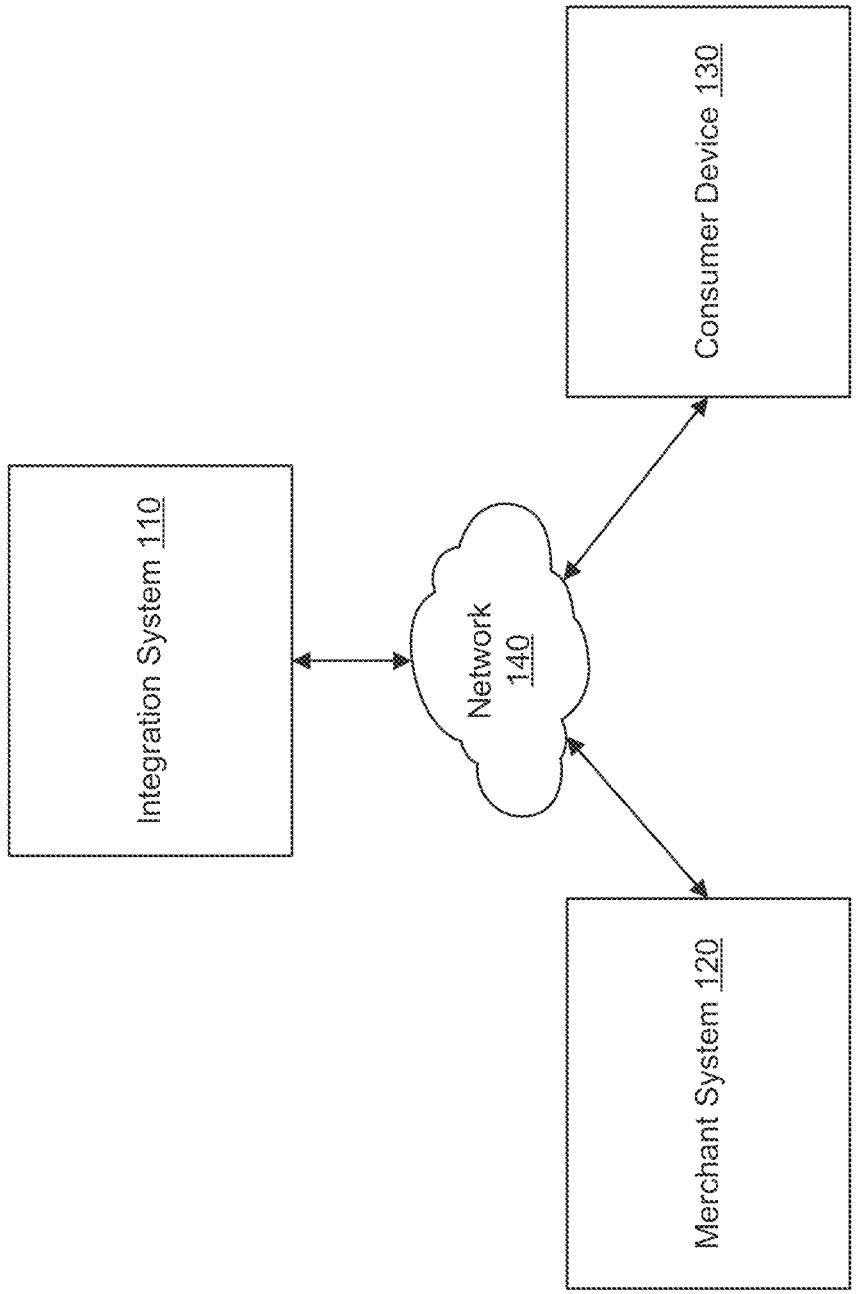
FIG. 1 illustrates a distributed environment for implementing catalog integration across distributed systems and interfaces, in accordance with the embodiments disclosed herein.

FIG. 1 illustrates a distributed environment for implementing catalog integration across distributed systems and interfaces, in accordance with the embodiments disclosed herein. In this illustration, integration system 110, merchant system 120, and consumer device 130 may communicate via network 140 in a distributed communication environment.

Figure 2:
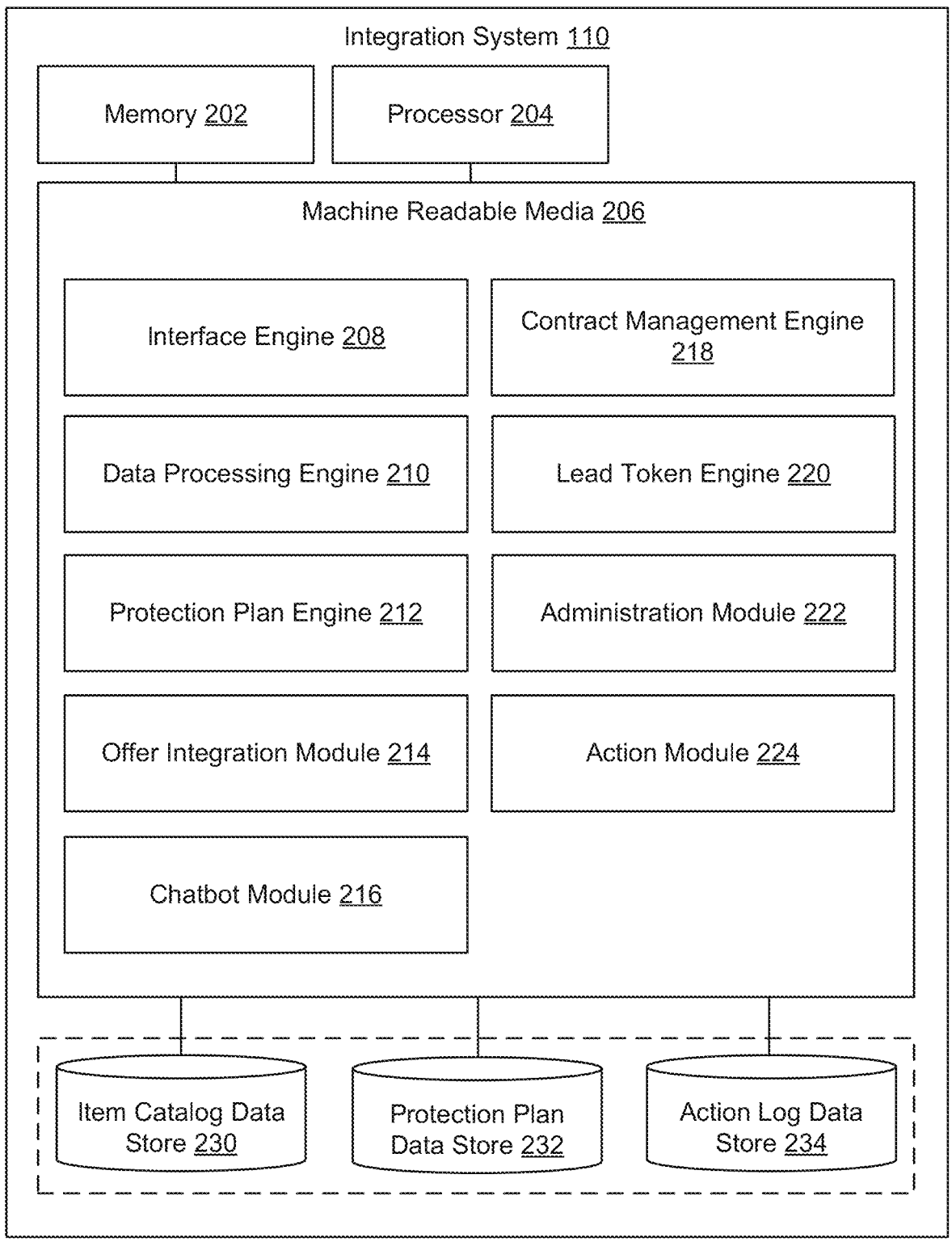
FIG. 2 illustrates an integration system, in accordance with the embodiments disclosed herein.

Additional details associated with integration system 110 are illustrated in FIG. 2. Integration system 110 may comprise, for example, memory 202, processor 204, machine readable media 206, and one or more data stores, including item catalog data store 230, protection plan data store 232, and action log data store 234.

Memory 202 may comprise random-access memory ("RAM") or other dynamic memory for storing information and instructions to be executed by processor 204. Memory 202 might also be used for storing temporary variables or other intermediate information during execution of instructions to be executed by processor 204. Memory 202 may also comprise a read only memory ("ROM") or other static storage device coupled to a bus for storing static information and instructions for processor 204.

Processor 204 may comprise a general-purpose or special-purpose processing engine such as, for example, a microprocessor, controller, or other control logic. Processor 204 may be connected to a bus, although any communication medium can be used to facilitate interaction with other components of integration system 110 or to communicate externally.

Machine readable media 206 may comprise one or more interfaces, circuits, and modules for implementing the functionality discussed herein. Machine readable media 206 may carry one or more sequences of one or more instructions to processor 204 for execution. Such instructions embodied on machine readable media 206 may enable integration system 110 to perform features or functions of the disclosed technology as discussed herein. For example, the interfaces, circuits, and modules of machine readable media 206 may comprise, for example, interface engine 208, data processing engine 210, protection plan engine 212, offer integration module 214, chatbot module 216, contract management engine 218, lead token engine 220, administration module 222, and action module 224.

Figure 3:
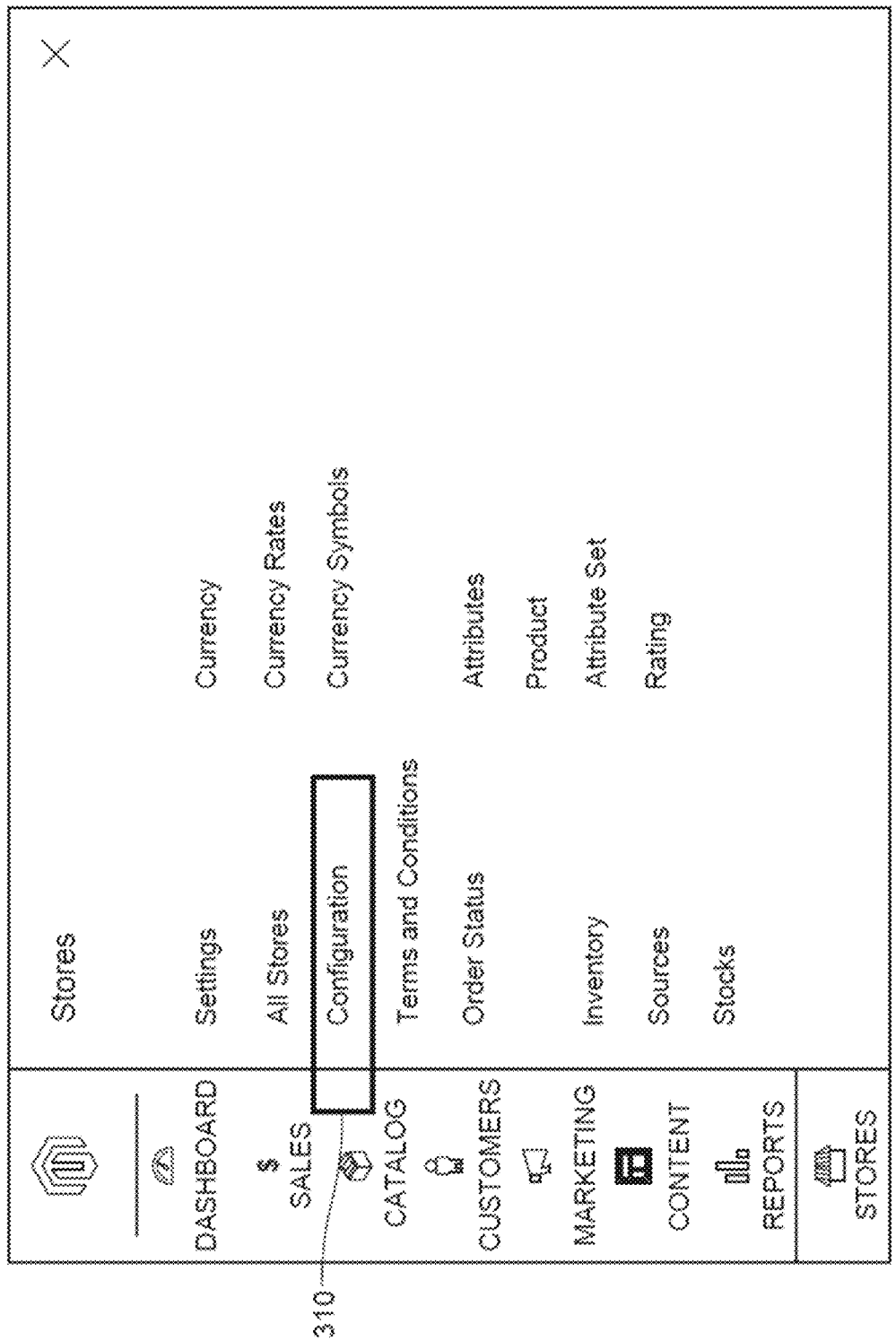
FIG. 3 is an illustrative interface to receive configuration information, in accordance with the embodiments disclosed herein.

Interface engine 208 may also be configured to receive configuration information from an administrative user. An illustrative interface is provided with FIG. 3, which is an interface to receive administrative user configuration information to begin providing product protection plan offers in association with a merchant user. For example, an administrative user may activate tool 310 to provide administrative user configuration information and protection plan offer information to interface engine 208. The information may be stored with protection plan data store 232. Activation of tool 310 may provide the ability to configure protection plan offers by creating a new administrative account or by providing credentials from an existing account associated with administrative user configuration information.

FIG. 4 illustrates a configuration menu, in accordance with the embodiments disclosed herein. In this illustration, various drop-down options are provided to configure a network document associated with a merchant user. The configuration menu may enable the user to select the individual features to leverage with merchant system 120, including providing protection plan offers and creating service contracts, balanced cart, display cart offers, and enable refunds.

By activating the "balanced cart" option, the module may automatically handle cart balancing for protection plan orders. For example, if a consumer user increases or decreases the quantity of items, the quantity for the related protection plan offers in the cart should also increase or decrease. In addition, if a consumer user has completely removed a product from the cart, any related protection plan offers should be removed from the cart as well so the consumer user does not accidentally purchase a protection plan without the corresponding item.

By activating the "display cart offers" option, the module enables the ability to present protection plan offers directly in the shopping cart. The items may have been stored with item catalog data store 230, mapped with one or more protection plan offers stored in protection plan data store 232, and are live at merchant system 120.

By activating the "enable refunds" option, the module may enable a process that can automatically process refunds for protection plan offers.

Interface engine 208 may be configured to adjust authentication settings, as illustrated in FIG. 5. The authentication settings may include, for example, mode, identifier (ID), API key, Sandbox® store ID, and Sandbox® API key. "Mode" may identify types of authentication, including live authentication or external authentication (e.g., via Sandbox®) that are passed to interface engine 208 (e.g., vi a secure authentication channel).

Figure 6:
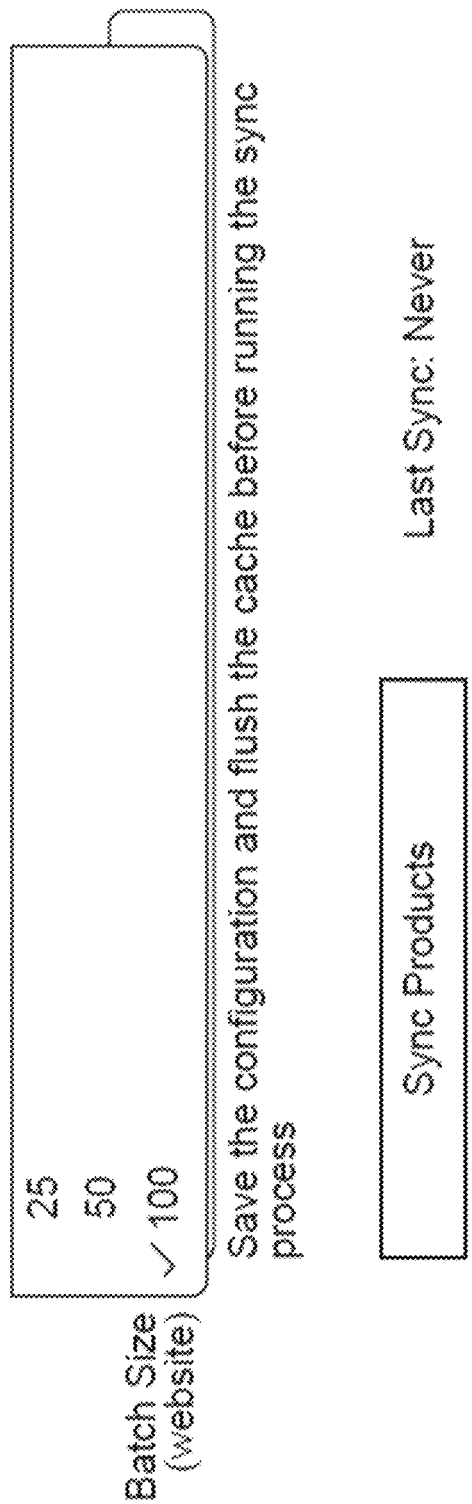
FIG. 6 illustrates an item syncing interface, in accordance with the embodiments disclosed herein.

Interface engine 208 may also be configured to receive a catalog of items. The catalog of items may include, for example, an item name, description, brand, category, image, price, reference ID, parent reference ID (allows the association of multiple product variants with a single parent product), SKU, GTIN, UPC code, ASIN, barcode. Information about the items may be received (e.g., in a file format) using an interface illustrated in FIG. 6. When the catalog of items is received, the item information may be stored in item catalog data store 230. In some examples, the items can be synchronized with item catalog data store 230 and may occur in batches of 25, 50, and 100 items.

Interface engine 208 may also be configured to provide one or more interfaces for receiving information about one or more protection plan offers. Once the information is received via the interface, the protection plan offers may be processed using protection plan engine 212. The protection plan offers may include an array of recommended protection plans comprising, for example, plan ID, plan name, plan category, price, term length, coverage type, service type (for claims), when coverage begins, deductible, a link to plan details and terms, and/or various strings of marketing text to be used in the offer. The protection plan offer information may be stored in protection plan data store 232.

Data processing engine 210 may be configured to match one or more items with one or more protection plan offers. The protection plan offer may be matched to an item when a characteristic of the protection plan offer matches an item property. In some examples, automated mapping is based primarily on product category, which is mapped to certain protection plan categories. In some examples, automated mapping is based on product title, store, or any of the product identifiers (e.g., SKU, GTIN, UPC, ASIN), and can be influenced by price (e.g., if two items are in the same product category but at different price levels, they could end up mapped to different plans).

Offer integration module 214 may be configured to provide a protection plan offer at a network document (e.g., webpage) of merchant system 120. For example, once one or more protection plan offers are identified for an item, the protection plan offers may be integrated as a frame object component of a network document (e.g., webpage) associated with merchant system 120. The frame object may link the protection plan offer to integration system 110 that is remote from merchant system 120.

Offer integration module 214 may also be configured to provide shipping options at a network document (e.g., webpage) of merchant system 120. For example, once one or more shipping options are identified for an item, the protection plan offers may be integrated as a frame object component of a network document (e.g., webpage) associated with merchant system 120. The frame object may link the shipping option to integration system 110 that is remote from merchant system 120 (e.g., shipping through a third party entity).

Figure 7:
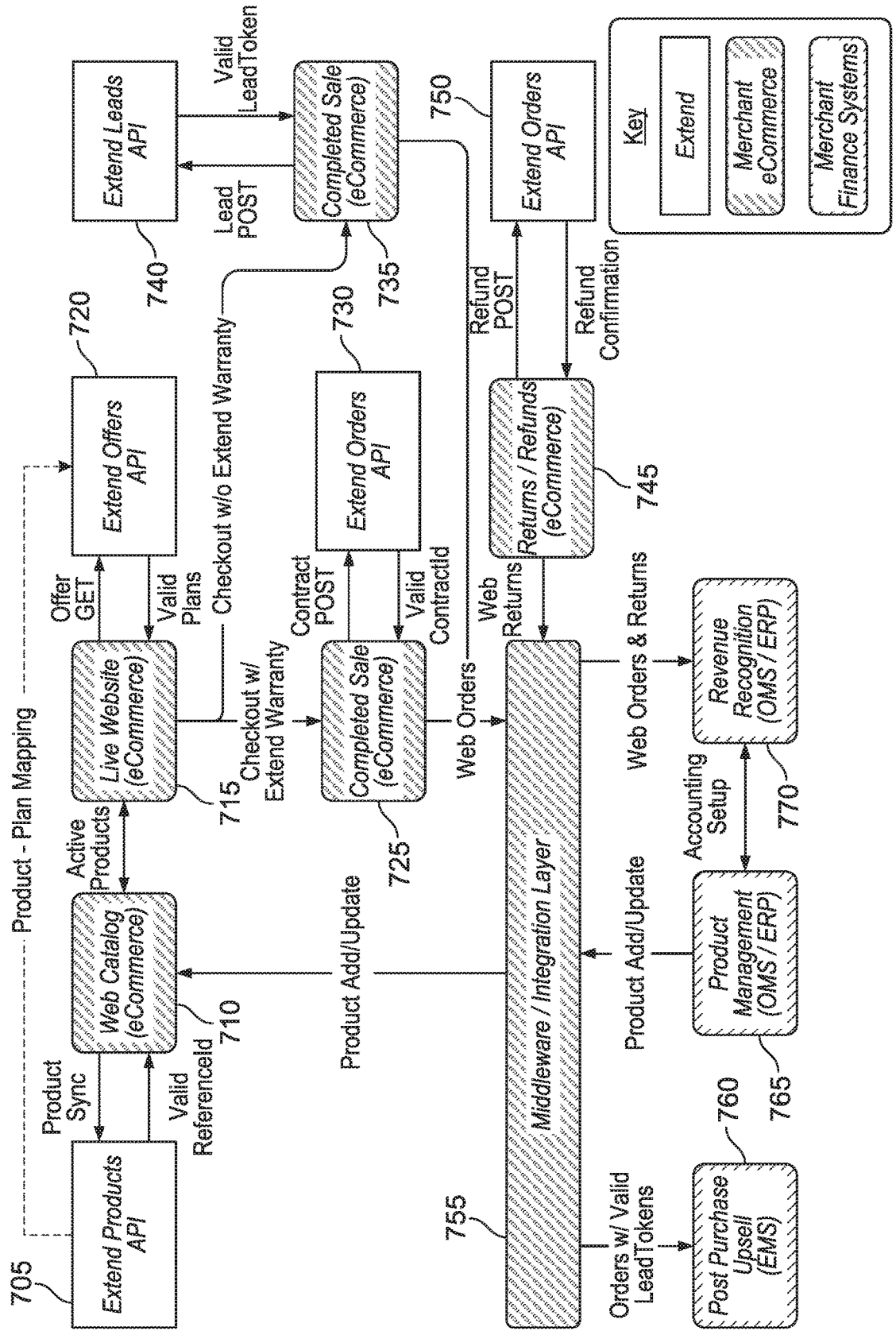
FIG. 7 illustrates an example of integrating one or more protection plan offers with merchant system, in accordance with the embodiments disclosed herein.

An illustrative example of integrating one or more protection plan or shipping offers with merchant system 120 is provided in FIG. 7. For example, merchant system 120 may integrate with different aspects of integration system 110. These integration points may be accomplished by merchant system 120 passing information directly through the APIs associated with integration system 110, or by using one or more plugins associated with integration system 110 for various eCommerce platforms (e.g., a Shopify App, Magento extension, Salesforce Commerce Cloud cartridge, BigCommerce App, or other applications).

In some examples, the plugins associated with integration system 110 may automate the API integration for merchants. As a specific example, for the step of syncing products to integration system 110, a merchant could either write code on merchant system 120 that transmits product information from their web catalog to integration system 110 via a Products API. In another example, if a merchant was on an eCommerce platform, they could install a Shopify App and that app could automatically synchronize the product information with integration system 110 on the merchant's behalf.

At block 705, item information from a merchant web catalog of merchant system 120 may be received during a synchronization process at the Products API of integration system 110. Products API of integration system 110 may validate the item information.

At block 710, integration system 110 may receive the validation referenceID.

At block 715, merchant system 120 may update the live website with the item information. The live website may transmit an offer GET command to integration system 110 via Offers API associated with integration system 110.

At block 720, integration system 110 may transmit one or more valid protection plans to the live website associated with merchant system 120.

At block 725, the live website of merchant system 120 may transmit transaction or other checkout information with the selected protection plan as a completed sale to the eCommerce platform. In this example, the protection plan is selected by the user.

At block 730, the eCommerce platform may transmit a contract POST command to integration system 110 via an Orders API or a Contracts API associated with integration system 110. The Orders API may enable merchants to report various actions related to a transaction including orders, whether product protection or shipping protection was purchased, whether a product was returned, etc. Integration system 110 may then process this information to create a contract (e.g., an extended product protection contract if extended product protection was purchased, a shipping protection contract if a purchased product is shipping and/or shipping protection was purchased), a lead, a refund, etc. A valid contractID may be transmitted back to the eCommerce platform.

At block 735, the live website of merchant system 120 may transmit transaction or other checkout information without any selected protection plan as a completed sale to the eCommerce platform. In this example, the protection plan is not selected by the user.

At block 740, the eCommerce platform may transmit a lead POST command to integration system 110 via Leads API associated with integration system 110. A valid lead token may be transmitted back to the eCommerce platform.

At block 745, the eCommerce platform may transmit a refund POST command to integration system 110 via Contracts API associated with integration system 110. A refund confirmation may be transmitted back to the eCommerce platform.

At block 750, the eCommerce platform of merchant system 120 may receive the refund confirmation of the returned item via the Orders API or a Contracts API.

At block 755, a middleware integration layer of merchant system 120 may transmit item information one or more items added to the web catalog, returned to the merchant, or removed from the web catalog. For example, the item information may be added when the item is received at a merchant warehouse associated with merchant system 120 (e.g., from a manufacturer or returned by a consumer). In another example, the item information may be removed when the item is ordered through the eCommerce platform of merchant system 120.

At block 760, a post purchase upsell component of merchant system 120 may receive an order with a valid lead token from the middleware integration layer of merchant system 120.

At block 765, an item may be added or updated. For example, the merchant finance system of merchant system 120 (e.g., which may be separate from the eCommerce platform) may interact with the middleware integration layer of merchant system 120.

At block 770, an item may be removed after a web order or a return. For example, the merchant finance system of merchant system 120 may interact with the middleware integration layer of merchant system 120.

Figure 8:
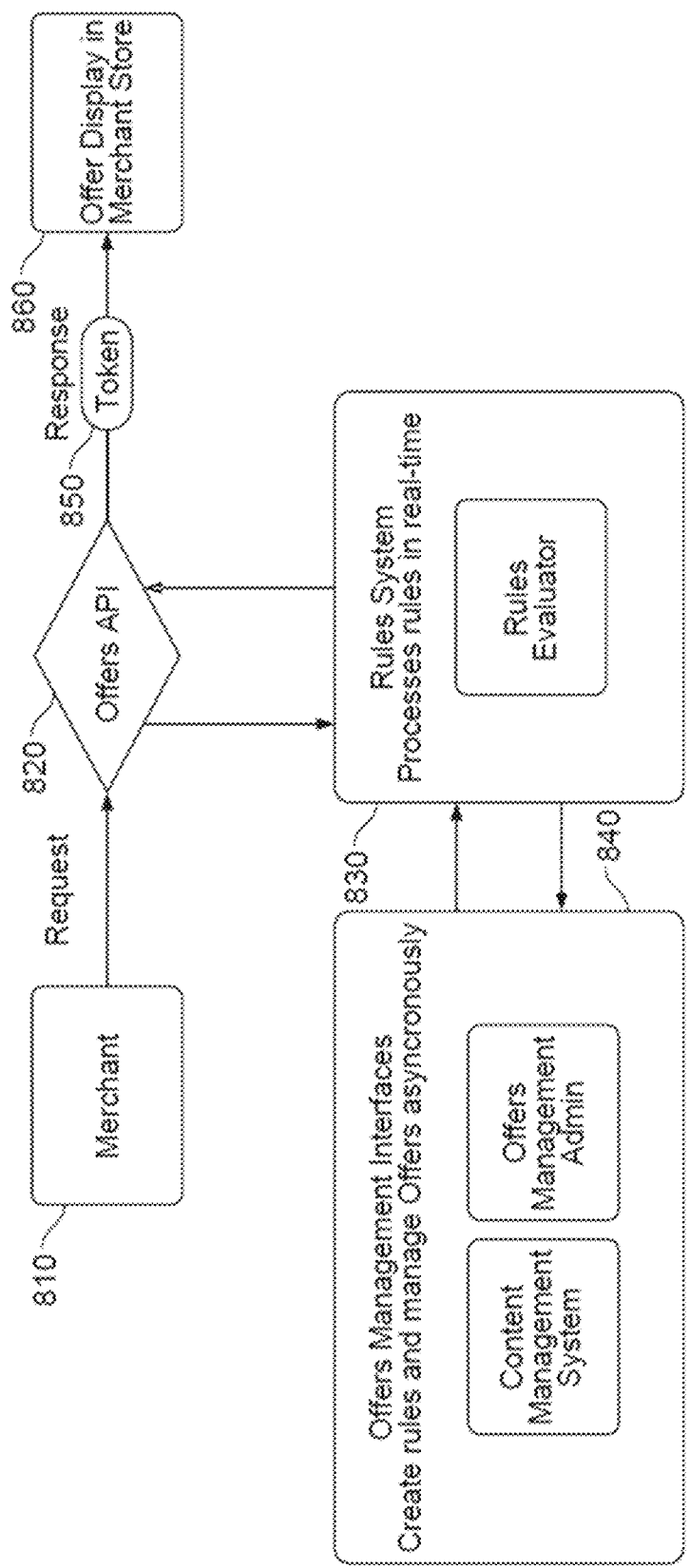
FIG. 8 illustrates an example of integrating one or more protection plan offers with merchant system, in accordance with the embodiments disclosed herein.

An illustrative example of integrating one or more protection plan offers with merchant system 120 is provided in FIG. 8. For example, merchant system 120 may dynamically deliver an optimized protection plan offer to the merchant and then to the customer.

At block 810, the live website of merchant system 120 may transmit a GET command to integration system 110 via Offers API associated with integration system 110.

At block 820, the Offers API associated with integration system 110 may transmit token 850 to live website of merchant system 120. Integration system 110 may determine one or more protection plan offers for display at the live website with the item.

Prior to transmitting token 850, Offers API associated with integration system 110 may determine one or more offers associated with the token. For example, at block 830, Offers API may interact with rules system associated with integration system 110 to determine one or more rules that identify one or more offers.

At block 840, the rules system associated with integration system 110 may interact with offers management interfaces associated with integration system 110. The offers management interfaces may be used to create or alter one or more rules that associated with the protection plan offers. The creation and management of these rules may be implemented asynchronously and not related to an order, return, or other transaction.

At block 860, the protection plan offer associated with token 850 may be displayed at the live website of merchant system 120 with the item.

Chatbot module 216 may be configured to provide questions and/or responses at a network document (e.g., webpage) associated with merchant system 120. The chatbot receives questions and provides answers corresponding with a pre-determined decision tree of questions and inputs based on protection plans, merchant information, and product information. For example, the chatbot may assist a consumer user by answering questions or providing information about one or more protection plan offers for an item. In another example, the chatbot may configure different question and response paths for adjudicating claims for the consumer user, an internal claims administrative user (e.g., for customer service agents taking claims via phone), or merchant claims administration tool.

In an illustrative example, the chatbot may receive a customer's email address and identification of a product they are filing a claim about, or alternatively, the customer may enter information associated with the protection plan (e.g., contract ID or merchant order ID). Chatbot module 216 may identify the customer and the protection plan about which the customer is filing a claim using the provided information. Once the protection plan contract is identified, chatbot module 216 can look up the correct decision tree to use. The decision trees may be generally associated with a protection plan, but there can be decision tree branches that are specific to a merchant or product category. Chatbot module 216 then walks the customer through a series of questions and customer inputs based on the selected decision tree, and the customer's path through that decision tree differ based on customer inputs. For example, in a furniture claim, one question in the decision tree may be whether the damage is a tear or a stain, and if the customer selects "stain" then the next question will be about the type of stain.

Contract management engine 218 may be configured to customize text in protection plan offers, shipping options, and information pages at the network document. The information may provide descriptions of items or merchants, item categories, or other relevant information about protection plan offers for consumer users. The contract management engine can provide text manually by an administrative user and/or automatically provide the information when a protection plan offer is displayed in different merchant stores.

Lead token engine 220 may be configured to determine one or more lead tokens. A lead token may correspond with an item that was purchased without a corresponding protection plan offer. The lead token may identify a consumer user to contact after a purchase of the item to follow up with another offer to acquire the protection plan.

Administration module 222 may be configured to provide information for administrative and merchant users. For example, a merchant customer service agent can log into an interface of the integration system and be walked through an online form that teaches the agent how to determine information generate a claim. The interface may dynamically display a correct question and response flow for a particular merchant or protection plan (e.g., based on a decision tree).

Administration module 222 (e.g., with data processing engine 210) may be configured to real-time automated mapping between a protection plan offer and an item (or one or more shipping options and an item). For example, administration module 222 may have the ability to map an item not previously stored in an item catalog data store and map the item to a protection plan offer in real-time. The mapping may be based on item category information and/or a trained ML model involving other item data.

Action module 224 may be configured to provide one or more services (e.g., using order data, protection plan offer information, or consumer user information). For example, action module 224 may initiate support for merchants by implementing one or more actions. Examples of actions may include, for example, creating a protection plan based on an purchased protection plan offer, create a lead token associated with a potential future consumer (e.g., using lead token engine 220), create items with corresponding information, cancel or update protection plan offers, initialize a refund process, update protection plan coverage dates based on delayed shipping timelines from the order date, generate a shipping protection order, and initiate original equipment manufacturer (OEM) protection plan services, returns management, or other post-purchase services. The actions may be stored with action log data store 234.

Action module 224 may be configured to select one or more actions automatically. For example, the actions may be chosen automatically based on predefined rules associated with the contents of the order information passed to integration system 110.

In an illustrative example, if the order information includes a product and an associated protection plan, a rule stored with integration system 110 (e.g., in protection plan data store 232 or action log data store 234) may match the combination of product and protection plan. Action module 224 can create a product protection or shipping protection contract for that customer and product. If, on the other hand, the order information included a product that can be protected through a protection plan but no protection plan was selected, a rule stored with integration system 110 may create a lead token instead (e.g., via lead token engine 220).

Figure 9:
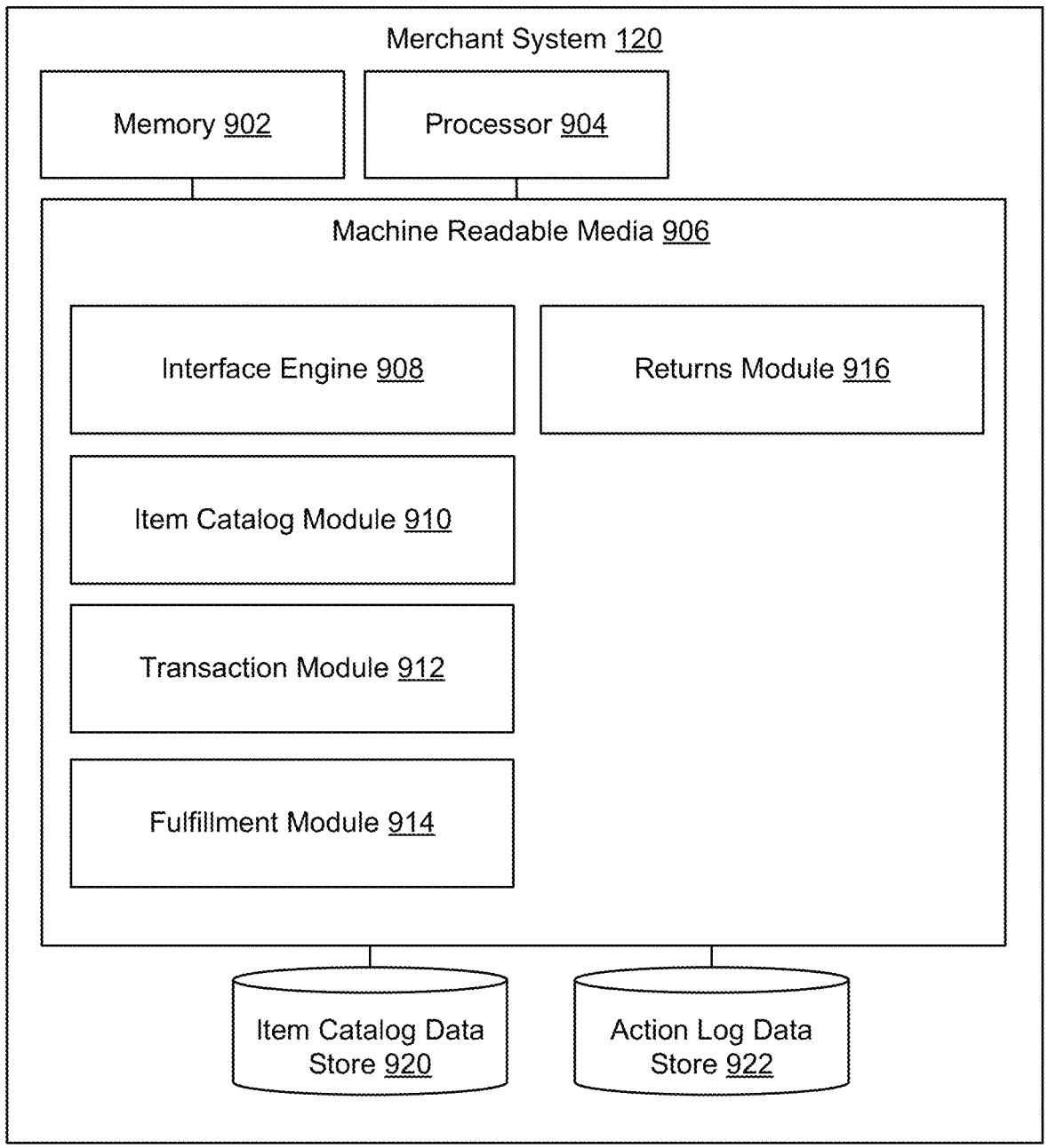
FIG. 9 illustrates a merchant system, in accordance with the embodiments disclosed herein.

FIG. 9 illustrates a merchant system, in accordance with the embodiments disclosed herein. As illustrated, merchant system 120 may comprise, for example, memory 902, processor 904, machine readable media 906, and one or more data stores, including item catalog data store 920 and action log data store 922.

Memory 902 may comprise random-access memory ("RAM") or other dynamic memory for storing information and instructions to be executed by processor 904. Memory 902 might also be used for storing temporary variables or other intermediate information during execution of instructions to be executed by processor 904. Memory 902 may also comprise a read only memory ("ROM") or other static storage device coupled to a bus for storing static information and instructions for processor 904.

Processor 904 may comprise a general-purpose or special-purpose processing engine such as, for example, a microprocessor, controller, or other control logic. Processor 904 may be connected to a bus, although any communication medium can be used to facilitate interaction with other components of merchant system 120 or to communicate externally.

Machine readable media 906 may comprise one or more interfaces, circuits, and modules for implementing the functionality discussed herein. Machine readable media 906 may carrying one or more sequences of one or more instructions processor 904 for execution. Such instructions embodied on machine readable media 906 may enable merchant system 120 to perform features or functions of the disclosed technology as discussed herein. For example, the interfaces, circuits, and modules of machine readable media 906 may comprise, for example, interface engine 908, item catalog module 910, transaction module 912, fulfillment module 914, and returns module 916.

Interface engine 908 may be configured to provide a network document associated with merchant system 120 to a browser application of consumer device 130. For example, the network document may include an electronic storefront to purchase items provided by merchant system 120. Consumer device 130 may access the network document via network 140.

Figure 10:
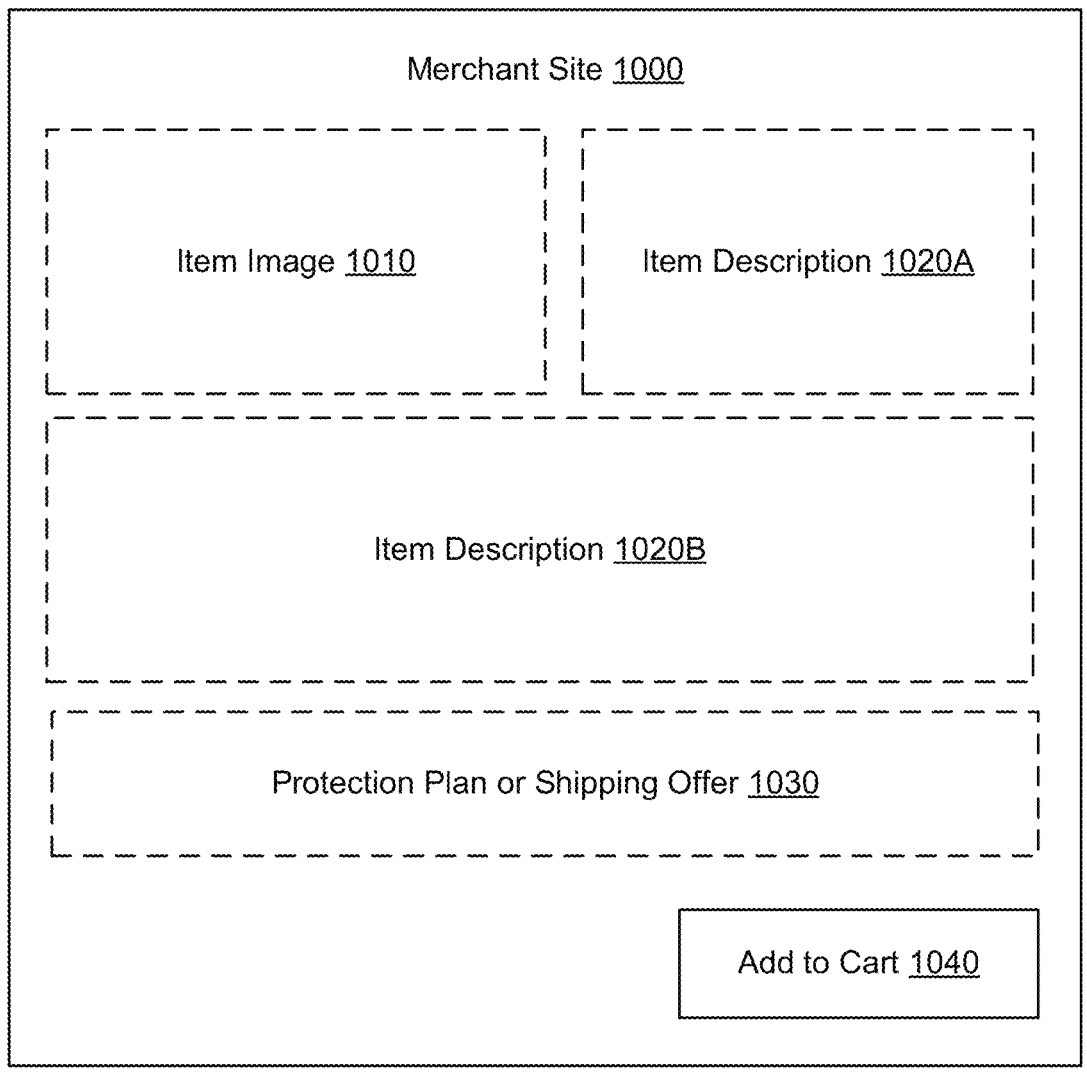
FIG. 10 illustrates a layout of a network document associated with a merchant system, in accordance with the embodiments disclosed herein.

An illustrative layout of a network document associated with merchant system 120 is provided with FIG. 10. In this example, merchant site 1000 includes item image 1010, one or more item descriptions 1020 (illustrated as first item description 1020A and second item description 1020B), protection plan or shipping offer 1030, and "add to cart" tool 1040. Protection plan or shipping offer 1030 may be a frame object that is replaceable and updated by integration system 110.

Figure 11:
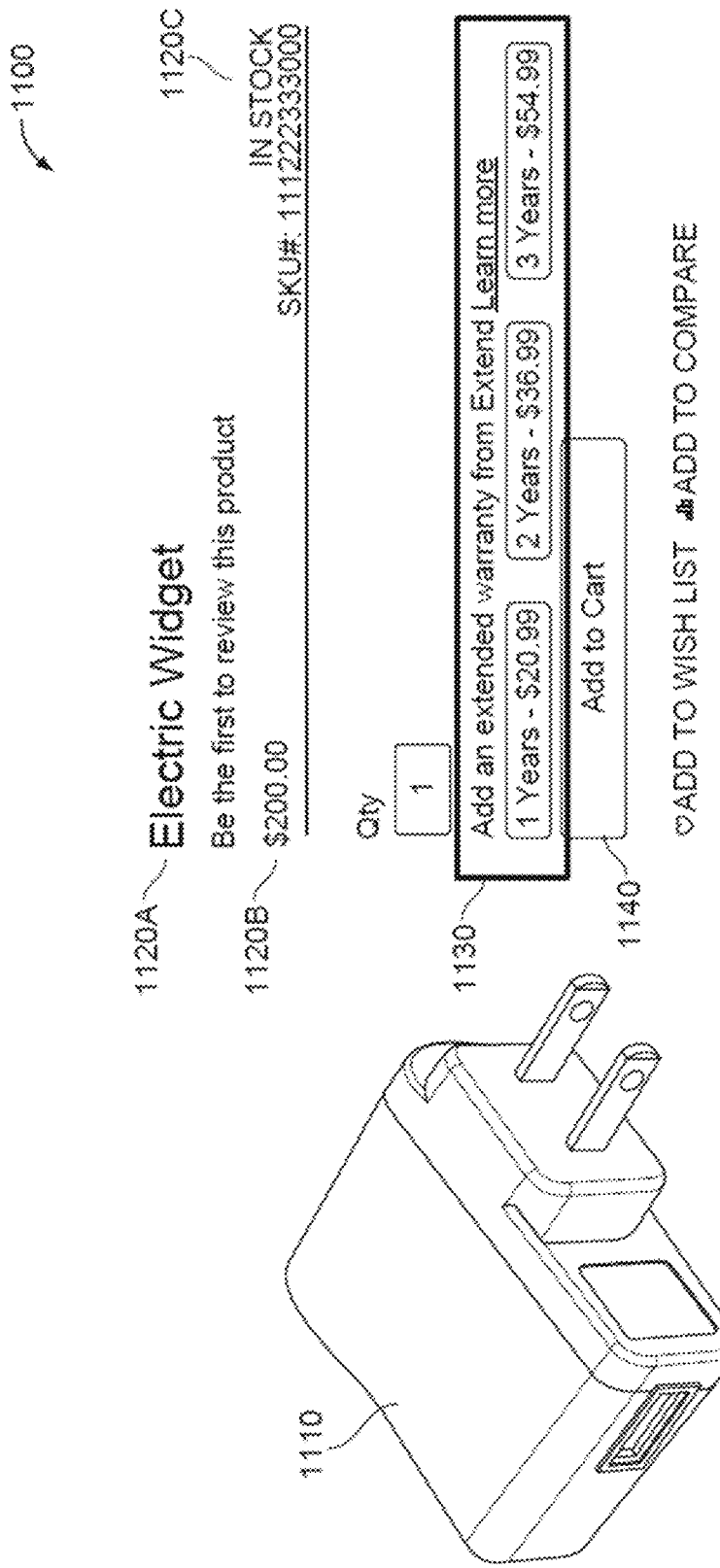
FIG. 11 illustrates an example of a network document associated with a merchant system, in accordance with the embodiments disclosed herein.

An illustrative example of a network document associated with merchant system 120 is provided with FIG. 11. In this example, merchant site 1100 includes item image 1110, one or more item descriptions 1120 (illustrated as first item description 1120A, second item description 1120B, and third item description 1120C), protection plan or shipping offer 1130, and "add to cart" tool 1140.

For example, once the installation steps are completed by the merchant user, one or more protection plans or shipping offers may be provided in a frame object for display at 1130. In some examples, the merchant may be authenticated and identify a catalog of items offered by merchant system 120. The items may be synced with integration system 110 and associated with one or more protection plans or shipping offers. The available protection plans or shipping offers may be displayed in the storefront at 1130. The network document may correspond with Product Detail Page, Interstitial Modal, and the Shopping Cart. The protection plans and/or shipping offers may be shown above the "add to cart" tool 1140.

Figure 12:
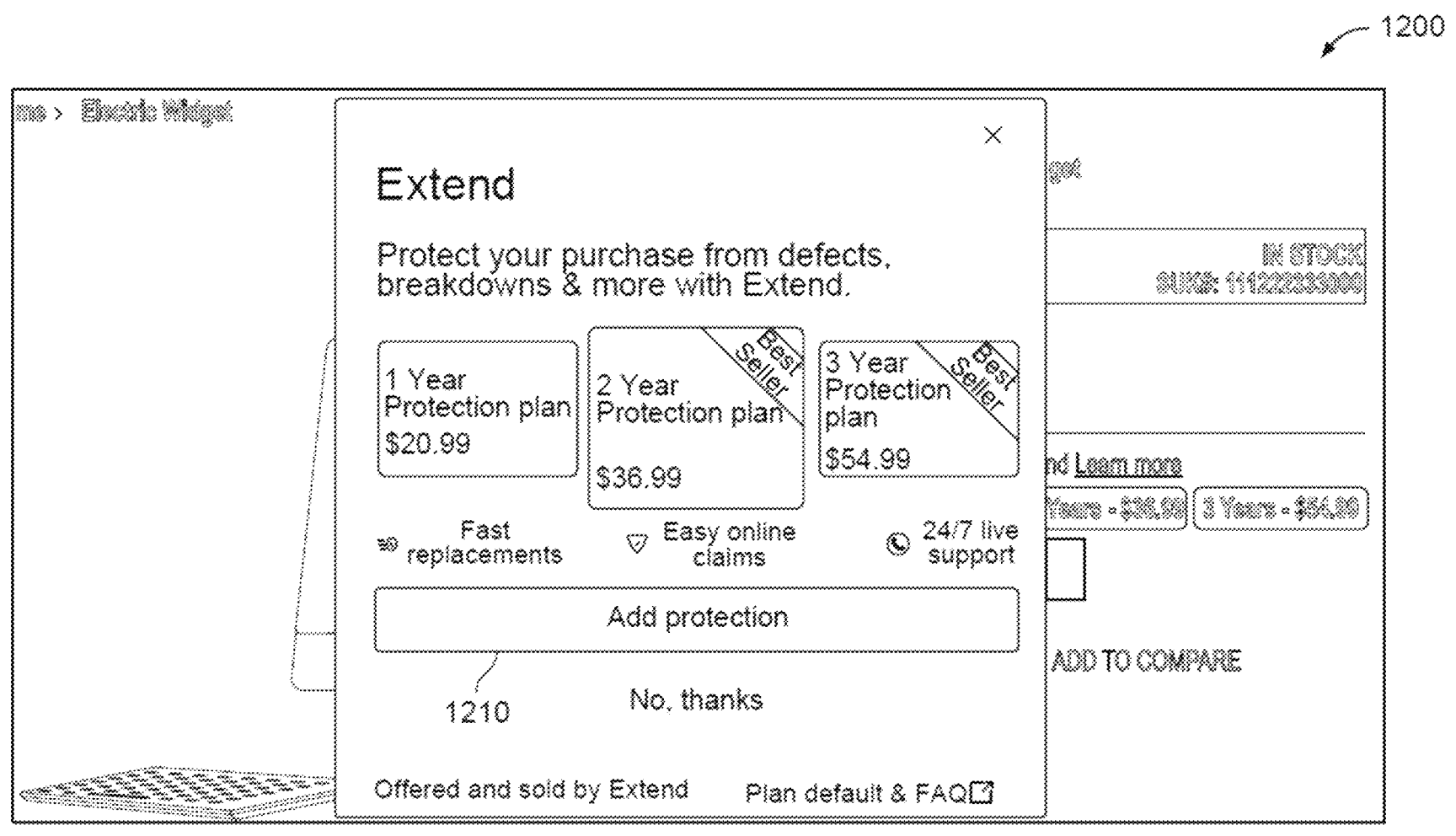

An illustrative example of a network document associated with merchant system 120 is also provided with FIG. 12. In this example, merchant site 1200 includes a plurality of protection plan offers for the item illustrated in FIG. 11. Shipping options may also or alternatively be provided.

For example, the network document may identify whether a protection plan offer was selected. Using a tool (e.g., provided by integration system 110) incorporated with the merchant website, the website may display the protection plan offer when the corresponding item is displayed. An indication of whether the protection plan offer was selected or not selected may be determined. When selecting the "add to cart" tool 1140, if no protection plan offer is selected, the consumer user may see a modal window displaying the linked protection plan offers to the item they have added. Selecting the "add protection" tool 1210 may add a protection plan offer to the electronic shopping cart in addition to the item.

In some examples, an API call is activated to send analytics back to integration system 110 to let the system know whether or not a user saw the protection plan offers. In some examples, the Interstitial Modal (e.g., displaying the protection plan offers) may be provided whenever the Product Detail Page or the Shopping Cart is displayed. The protection plan offers may be pre-fetched when the user first loads the page, so no additional network request may be needed.

Figure 13:
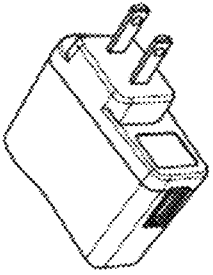
FIG. 13 illustrates an example of a network document associated with a merchant system, in accordance with the embodiments disclosed herein.

An illustrative example of a network document associated with merchant system 120 is also provided with FIG. 13. In this example, the "add to cart" tool 1140 for the item illustrated in FIG. 11 was activated and the item was added to the electronic shopping cart without the protection plan offer. A second opportunity to add a protection plan offer may be provided with FIG. 13 in example 1300 at the "add protection" tool 1310. If selected, merchant system 120 may add a protection plan offer to the electronic shopping cart in addition to the item.

Figure 14:
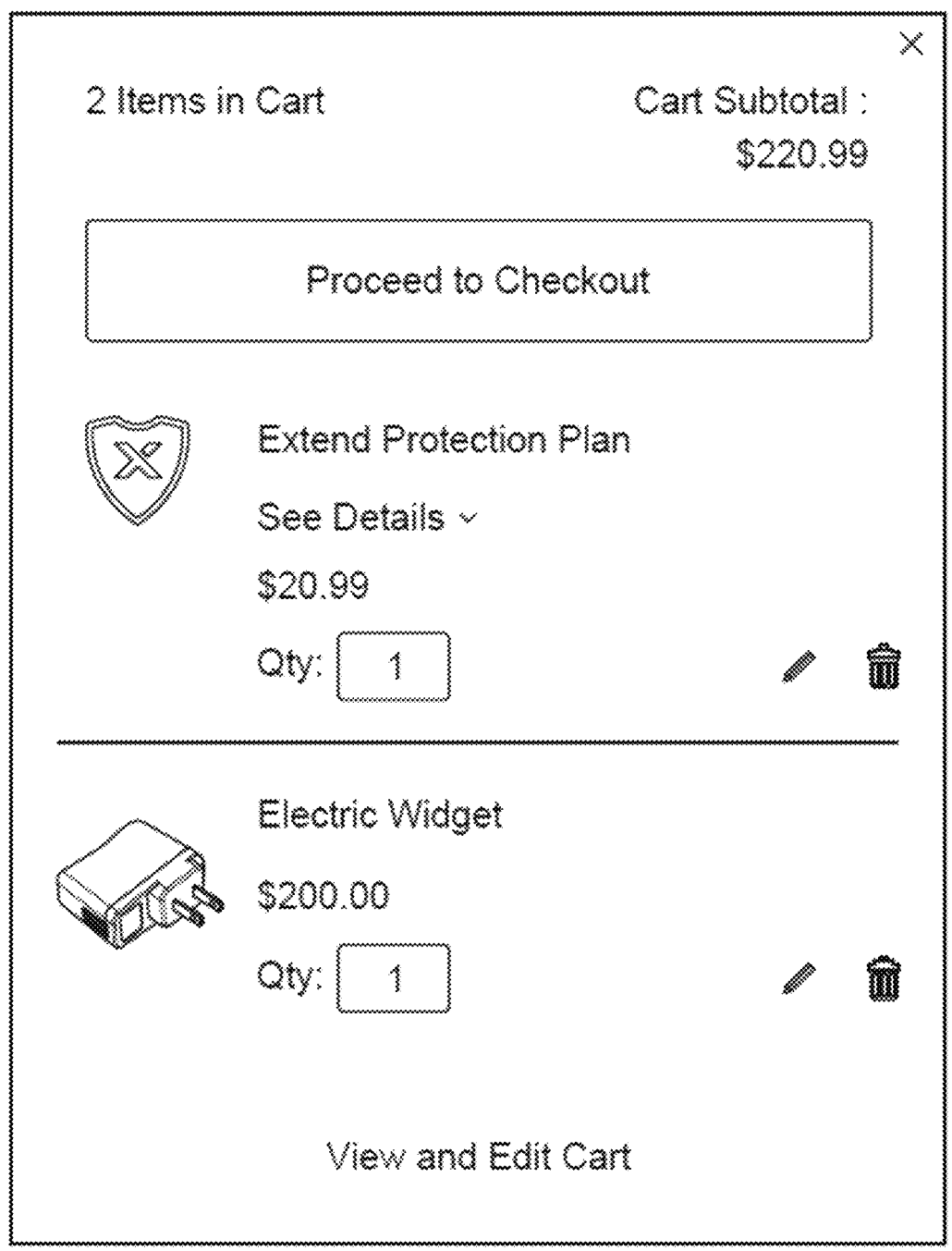
FIG. 14 illustrates an example of a network document associated with a merchant system, in accordance with the embodiments disclosed herein.

An illustrative example of a network document associated with merchant system 120 is also provided with FIG. 14. In this example, an electric shopping cart is illustrated for the item illustrated in FIG. 11. For example, a protection plan offer and an item associated with merchant user may be added to the electronic shopping cart.

In some examples, the protection plan offer may be manually added to an order with an item, as illustrated in FIG. 15. In this example, an item may be added to an electronic shopping cart without a protection plan offer. The protection plan offer may be added using the "add protection" tool 1510 after the item is added to the electronic shopping cart.

Item catalog module 910 may be configured to provide information associated with an item. For example, the information may comprise an item name, description, brand, category, image, price, reference ID, parent reference ID (e.g., in order to associate multiple product variants with a single parent product), SKU, GTIN, UPC code, ASIN, and/or barcode. The item information may be provided and/or synced with integration system 110 to identify one or more protection plan offers associated with the item. The item may be offered for purchase by the merchant at the network document. The item information may be stored in item catalog data store 920.

Transaction module 912 may be configured to initiate a transaction process for an item. Once "add to cart" tool is activated for a particular item, the transaction process may be initiated for the item locally at the merchant system 120 to provide the item to the consumer user.

Figure 16:
FIG. 16 illustrates information provided in association with a transaction process, in accordance with the embodiments disclosed herein.

FIG. 16 illustrates information provided in association with a transaction process, in accordance with the embodiments disclosed herein. For example, once the transaction has completed, a contract ID 1610 may be provided in association with the item and the protection plan offer. The contract ID 1610 may be provided at the network document or provided through an electronic communication system.

Fulfillment module 914 may be configured to initiate a process to provide the item to the consumer user. For example, item fulfilment may be a process consisting of receiving a physical item and shipping the item for distribution to the consumer user.

Returns module 916 may be configured to initiate a return process to return the item from the consumer user back to the merchant. For example, the process may comprise identifying that the item was received from the consumer user at a shipping facility, updating a data store that the item was received (e.g., and available for a new transaction), and returning any funds transferred back to an account of the consumer user.

An illustrative interface for initiating the return process is provided with FIG. 17. For example, the consumer user may select the item or protection plan offer to return and select the "request refund" tool 1710.

Figure 18:
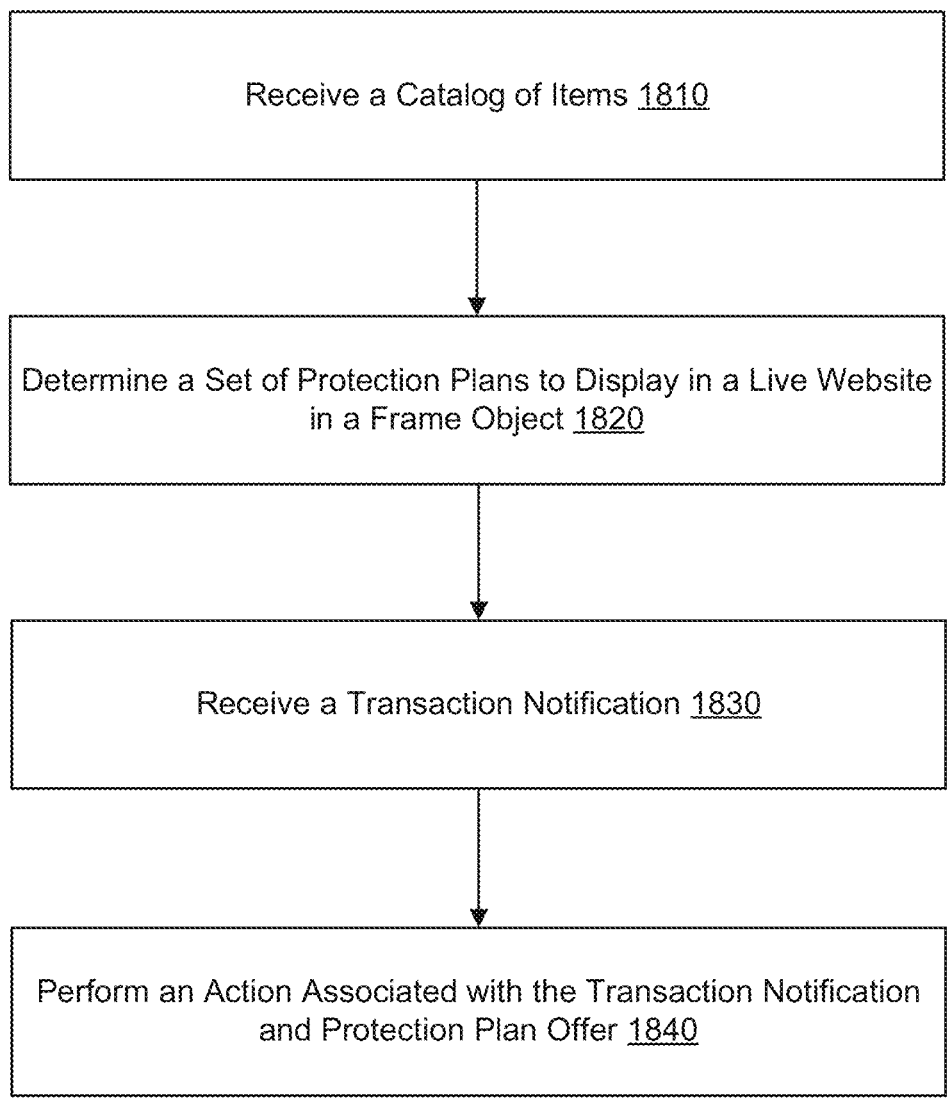
FIG. 18 illustrates a process for implementing an integration system, in accordance with the embodiments disclosed herein.

FIG. 18 illustrates a process for implementing an integration system, in accordance with the embodiments disclosed herein. In some examples, integration system 110 of FIG. 1 or other computing device may perform the process illustrated in FIG. 18.

At block 1810, the process may receive a catalog of items from a merchant. In certain embodiments, interface engine 208 of integration system 110 may receive the catalog of items.

At block 1820, the process may determine a set of protection plan offers to display in a live website associated with the merchant. In certain embodiments, data processing engine 210 and/or protection plan engine 212 of integration system 110 may determine the set of protection plan offers to display in the live website.

The live website may display items of the catalog of items with frame objects comprising the set of protection plan offers. In some embodiments, at least one of protection plan engine 212 and offer integration module 214 of integration system 110 may display the items of the catalog of items with the frame objects comprising the set of protection plan offers.

At block 1830, the process may receive a notification associated with a transaction involving a first item of the catalog of items and a customer. In certain embodiments, interface engine 208 of integration system 110 may receive the notification associated with the transaction.

At block 1840, the process may perform an action associated with the transaction notification and a first protection plan offer of the set of protection plan offers. In certain embodiments, action module 224 of integration system 110 may perform the action associated with the transaction notification and the first protection plan offer.

Where the transaction includes purchase of a first protection plan associated with the first protection plan offer, the process may for example: (a) create a contract (e.g., a product protection contract or a shipping protection contract) associated with the first item, the customer, and the first protection plan offer (e.g., a contract for a first protection plan associated with the first protection plan offer); or (b) generate a refund associated with the first item, the customer, and the first protection plan offer (e.g., a refund for the first item under a first protection plan associated with the first protection plan offer).

Where the transaction does not include purchase of a protection plan associated with the first protection plan offer, the process may generate a lead token associated with the first item, the customer, and the first protection plan offer. Accordingly leveraging the lead token, the first protection plan offer can be re-marketed to the customer at a later time.

Product Protection and Shipping Protection Provided Using a Single Integration System As alluded to above, embodiments of the presently disclosed technology can provide product protection offers and shipping protection offers using a single integration system. Additional details on such an integration follows.

Plans: Similar to product protection, embodiments can provide shipping protection as "plans" or "plan offers" on an integration system. Each shipping protection plan/plan offer may be a data object that includes properties representing what types of products/items are covered or excluded, coverage maximums, the associated plan terms & conditions, the premium to be charged, etc.

Embodiments may provide an internal user interface (UI) so that an administrative team (e.g., a Protection Plan Programs team) can easily configure and update product and shipping protection plans, enabling creation of both general and bespoke/customized programs for merchants, speeding up both the sales and integration process.

Onboarding Merchant Stores and Products: Embodiments can use the same/similar functionality to onboard merchant stores and merchant product catalogs onto the integration system. This enables quick mapping of products to plans (e.g., product and/or shipping protection plans), which can result in expedited provision of product and shipping protection plan offers on live merchant websites. Here, the same/similar methods as described above can be used to create a store on the integration system for product protection and shipping protection, or either individually. These methods may include: (1) automatically transferring store data via an eCommerce platform plugin (e.g. Shopify app, BigCommerce app, Magento extension, Salesforce Commerce Cloud extension); or (2) an administrator manually entering store data in an internal UI of the integration system.

As alluded to above, products (e.g., items sold by a merchant) can be uploaded onto the integration system for both product protection and shipping protection at the same time by any of the following exemplary methods: (a) automatically transferring product data via an eCommerce platform plugin (e.g. Shopify app, BigCommerce app, Magento extension, Salesforce Commerce Cloud extension); (b) creating product/update product API calls; (c) a CSV file of products can be processed by the integration system; (d) an administrator manually entering store data in an internal UI of the integration system; etc. In certain embodiments, the integration system may even identify new products in order data that a merchant provides to the integration system in an Orders API call. For example, if a previously unknown product appears in order data, the integration system can create a data object representing the product in real time (this may be the same/similar process that occurs when a merchant uploads a product catalog to the integration system via the Shopify app, product create API calls, CSV files, etc.). This enables merchants with large or frequently-changing product catalogs to get their integration live quickly and keep it up to date with improved product coverage without having to deal with cumbersome product create/update processes. That is, the above-described functionality can remove the need for a merchant to upload their whole product catalog before they start working with the integration system, and makes it easier for the merchant to keep their product catalog up to date with the integration system. This functionality may be available for both shipping protection and product protection programs.

Shipping Protection Plan Mapping: In certain examples, the integration system may need to determine whether a product is eligible for shipping protection. Embodiments may use various parameters to make this determination. For example, embodiments may first make a true/false determination regarding whether a product is a physical good that can be shipped. Ineligible (i.e. false) products could include digital goods, services, and products that are picked up from the store or hand delivered and installed by a merchant. If the first determination is true (i.e., the product is a physical good that can be shipped), embodiments may make a second true/false determination of whether the product is eligible for coverage per a policy (e.g., a policy of the integration system's service provider, a merchant policy, an insurance carrier's policy, any combination of the foregoing policies, etc.). This all can be manually set by an administrator via an internal UI of the integration system. Alternatively, eligibility can be automatically determined by product category data passed by a merchant, or via machine learning models using product data.

Shipping Protection Plan Presentment: A merchant can display shipping protection plan offers in their store (and/or on their live website) showing the price of associated shipping protection plans and their coverage details. There are various potential sales models that can be provided using the integration system. For example, via the integration system, a merchant may offer/provide: (a) opt-in shipping protection plans (e.g., a customer must click a toggle to add shipping protection to their order), (b) opt-out shipping protection plans (e.g., shipping protection is included unless a customer clicks a toggle to remove shipping protection from their order), (c) merchant-included shipping protection plans (e.g., a merchant adds shipping protection to every order and a customer cannot add or remove it).

As alluded to above, the integration system can allow a merchant to present shipping protection plan offers in various ways. For example, the integration system may provide a shipping protection plan Offers API that facilitates direct integration of shipping protection plan offers into a merchant's live website. This may leverage the same/similar integration process as described above for product protection (and more generally other protection plans) using the Offers API. Relatedly, the Offers API described above may be used to determine one or more shipping protection plan offers for display at the merchant's live website with an eligible product/item. The integration system can also enable software development kit (SDK) integration where a merchant can use the same SDK for both product protection offers and shipping protection offers. SDK may take product data, retrieve an applicable offer (e.g., a product protection or shipping protection offer), and automatically display a UI element representing the offer. As a third example, the integration system can allow a merchant to use an eCommerce application (e.g., Shopify app, BigCommerce app, Magento extension, Salesforce Commerce Cloud cartridge) to automatically generate offers (e.g., using Extend SDK).

Shipping Protection Order Reporting: The integration system can also facilitate easy/merchant friendly reporting of shipping protection orders. For example, a merchant can send a single packet of order data to the integration system for every order placed using the above-described Orders API. A merchant can also use the Orders API to update every order as it changes (items added/removed, order canceled, order shipped, etc.). From this order data, the integration system can: (a) create a product protection contract (i.e., a contract for a purchased product protection plan) and/or create a shipping protection contract (i.e., a contract for a purchased shipping protection plan); (b) cancel a product protection contract and/or cancel a shipping protection contract; (c) update a product protection contract (this may not be as applicable for shipping protection contracts); (d) create a lead (or a lead token) for product protection (this may not be as applicable for shipping protection contracts); (e) create a product on the integration system; etc.

Shipping Protection Claim Intake: As described above, the integration system can adjudicate protection claims such as product protection claims and shipping protection claims. For example, the integration system may utilize a chat application/bot to determine eligibility and help file a claim (e.g., a product protection or shipping protection-related claim) by asking relevant questions. Here the chat application/bot may leverage configurable decision trees for both product protection and shipping protection claim entitlement and adjudication so customers can file a claim and get approved online within minutes. Shipping protection-specific decision trees may be configured to handle claims for lost, stolen, or damaged packages. Accordingly, the chat application/bot can facilitate automated shipping protection claim approval and automatically assist in obtaining a repair/replacement of a product for the customer (e.g., for a product/package lost or damaged during shipping).

In various embodiments, employees/administrators of a company providing the integration system can file a claim (both product protection and shipping protection) on customer's behalf using an internal UI of the integration system while speaking to a customer. An internal administrator claim form can follow the same/similar decision tree as the chat application/bot.

Merchant customer service representatives can also use a merchant portal (e.g., a UI or API) to file a claim (both product protection and shipping protection) on the customer's behalf while speaking to a customer. A merchant portal claim form may follow the same/similar decision tree as the chat application/bot.

Shipping Protection Claim Fulfillment: Using the same/similar technology as described above, the integration system can also fulfill claims for both shipping protection and product protection. For example, Shopify customers can automatically issue a Shopify Promo code equal to the claim amount so the customer can repurchase the claims item(s) for both shipping protection or product protection claims. Embodiments can also automatically issue a virtual gift card equal to the claim amount so a customer can repurchase claims item(s) for both shipping protection and product protection claims. For some customers, customer service administrators/employees can manually repurchase the claims item(s) and send to the customer filing the claim.

Figure 19:
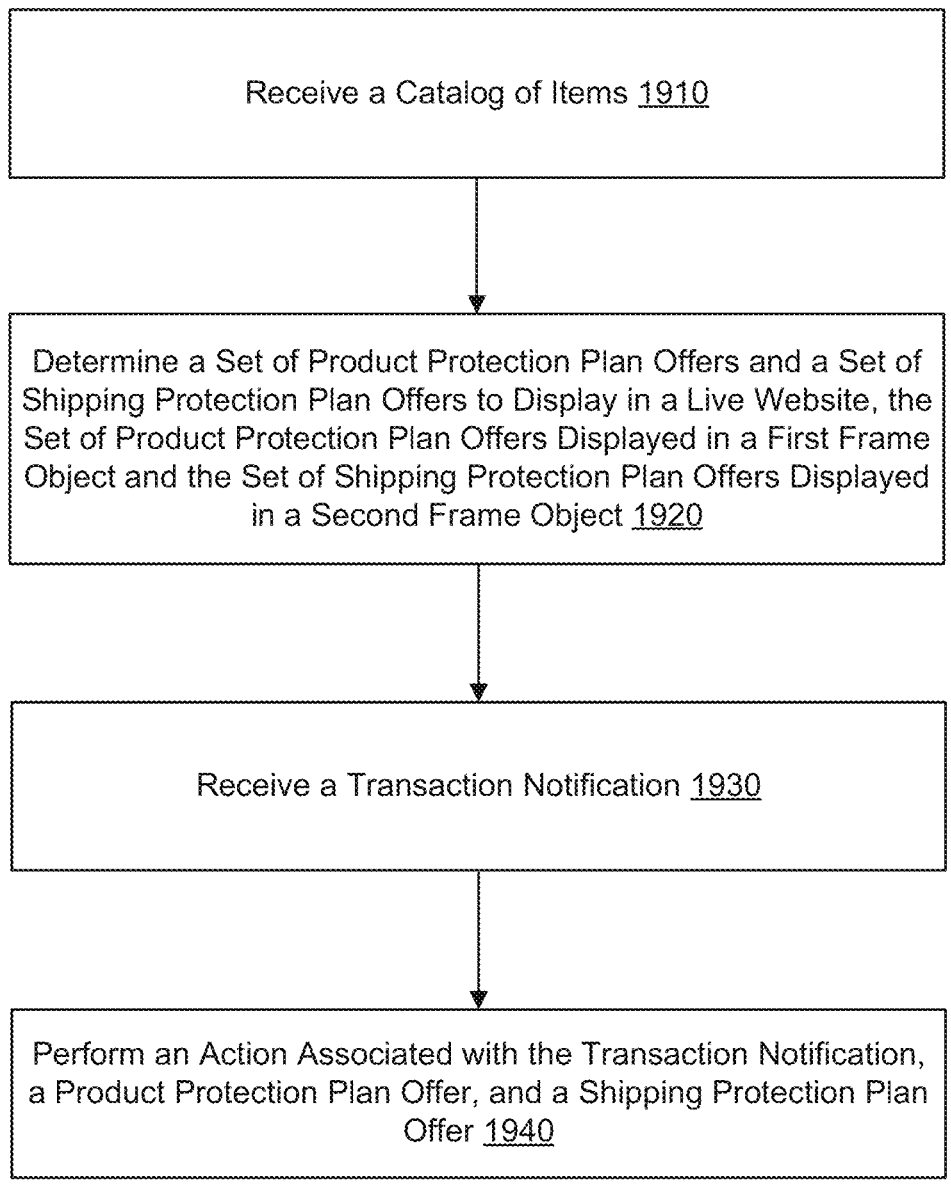
FIG. 19 illustrates a process for implementing an integration system, in accordance with the embodiments disclosed herein.

FIG. 19 illustrates a process for implementing an integration system, in accordance with the embodiments disclosed herein. In some examples, integration system 110 of FIG. 1 or other computing device may perform the process illustrated in FIG. 19.

At block 1910, the process may receive a catalog of items from a merchant. In certain embodiments, interface engine 208 of integration system 110 may receive the catalog of items.

At block 1920, the process may determine a set of product protection plan offers and a set of shipping protection plan offers to display in a live website associated with the merchant. In certain embodiments, data processing engine 210 and/or protection plan engine 212 of integration system 110 may determine the set of protection plan offers to display in the live website.

The live website may display items of the catalog of items with frame objects comprising the set of product protection plan offers and the set of shipping protection plan offers. For example, the process may display a first item of the catalog with a first frame object comprising the set of product protection plan offers and a second frame object comprising the set of shipping protection plan offers. In other embodiments, the set of product protection plan offers and the set of shipping protection plan offers may be bundled together in a single frame object.

In some embodiments, at least one of protection plan engine 212 and offer integration module 214 of integration system 110 may display the items of the catalog of items with the frame objects comprising the set of protection plan offers.

At block 1930, the process may receive a notification associated with a transaction involving a first item of the catalog of items and a customer. In certain embodiments, interface engine 208 of integration system 110 may receive the notification associated with the transaction.

At block 1940, the process may perform an action associated with the transaction notification, a first product protection plan offer of the set of product protection plan offers, and a first shipping protection plan offer of the set of shipping protection plan offers. In certain embodiments, action module 224 of integration system 110 may perform the action.

Where the transaction includes purchase of a first product protection plan associated with the first product protection plan offer and purchase of a first shipping protection plan associated with the first shipping protection plan offer, the process may for example: (a) create/generate a first contract associated with the first item, the customer, and the first product protection plan offer (e.g., a contract for a first product protection plan associated with the first product protection plan offer); and/or (b) create/generate a second contract associated with the first item, the customer, and the first shipping protection plan offer (e.g., a contract for a first shipping protection plan associated with the first shipping protection plan offer).

In certain examples where the transaction includes purchase of a first shipping protection plan associated with the first shipping protection plan offer, the process may for example: (a) generate a refund associated with the first item, the customer, and the first shipping protection plan; and/or (b) initiate shipment of a replacement product associated with the first item, the customer, and the first shipping protection plan.

In some examples, the process may include determining that the first item is eligible for shipping protection. This may comprise: (a) determining that the first item is a physical good that can be shipped; and (b) determining that the first item is eligible for coverage under a service provider's policy.

Figure 20:
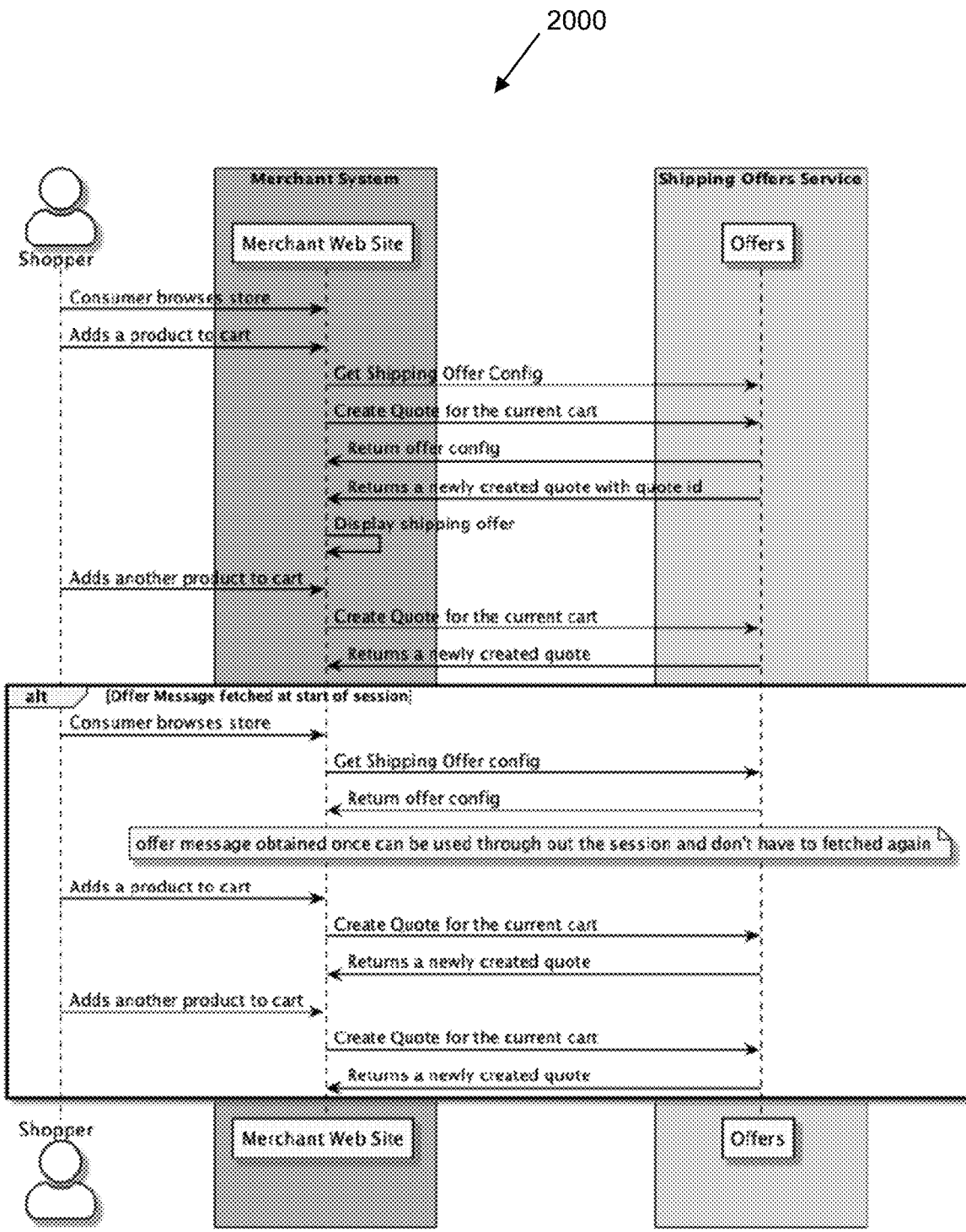
FIG. 20 illustrates an example flow diagram that may be used by an integration system to provide shipping protection offers on a live merchant website.

FIG. 20 illustrates an example flow diagram 2000 that may be used by an integration system to provide shipping protection offers on a live merchant website. As illustrated in FIG. 20, communications are transmitted between shopper, merchant system, and shipping offers service. Shopper browses a store and adds a product to a cart from merchant system. Merchant system may request a shipping offer config and create a quote for the current cart from shipping offers service. Shipping offers service may return the shipping offer config and return a newly created quote with a quote ID. Merchant system may display the shipping offer. Shopper may add another product to the cart. Merchant system may create a quote for the current cart with shipping offers service. Shipping offers service may return a newly created quote. In an alternate process, shopper browses a store from merchant system. Merchant system may get a shipping offer config with shipping offers service. Shipping offers service may return the shipping offer config. The offer message obtained once can be used throughout the session and doesn't need to be fetched again. Shopper adds a product to a cart from merchant system. Merchant system creates a quote for the current cart with shipping offers service. Shipping offers service returns a newly created quote. Shopper adds another product to the cart from merchant system. Merchant system creates a quote for the current cart with shipping offers service. Shipping offers service returns a newly created quote.

Figure 21:
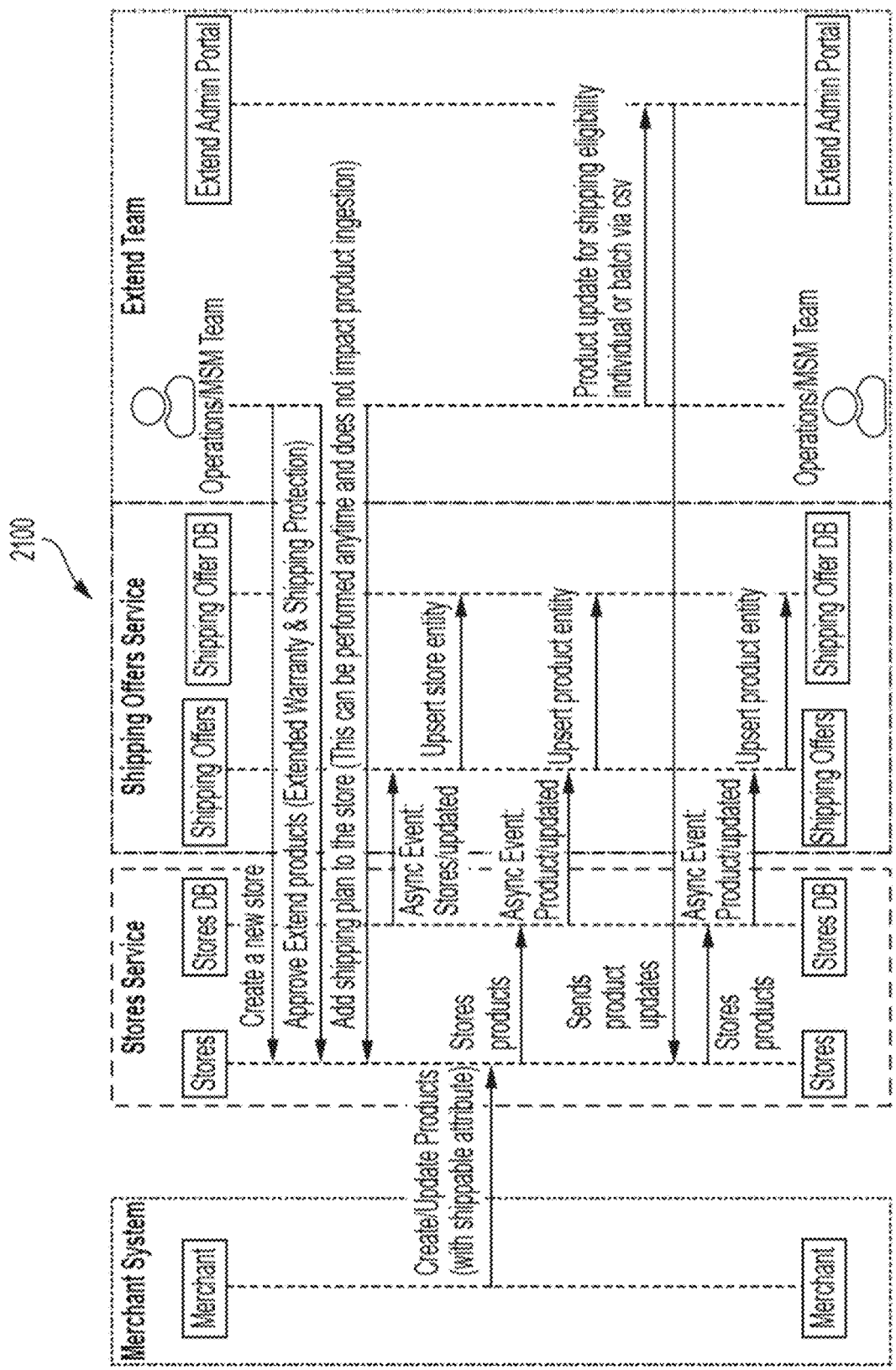
FIG. 21 illustrates another example flow diagram that may be used by an integration system to provide shipping protection offers on a live merchant website.

FIG. 21 illustrates an example flow diagram 2100 that may be used by an integration system to provide shipping protection offers on a live merchant website. Flow diagram 2100 may be particularly utilized to onboard new merchants. As illustrated in FIG. 21, Extend operations team creates a new store with the stores service. Extend operations team approves Extend products (with product protection/warranty and shipping protection) with the stores service. Extend operations team adds shipping plan to the store with the stores service. This can be performed anytime and does not impact product ingestion. Stores database transmits an async event: stores/updated to shipping offers service. Shipping offers service transmits an upsert store entity to shipping offers database. Merchant system transmits a create/update products message to stores service. The create/update products message includes a shippable attribute. Stores service stores products in stores database. Stores database transmits an async event: product/updated to shipping offers service. Shipping offers service transmits an upsert product entity to shipping offers database. Extend operations team transmits a product update for shipping eligibility individual or batch via CSV. Extend administration portal transmits product updates to stores service. Stores service stores products in stores database. Stores database transmits an async event: product/updated to shipping offers service. Shipping offers service transmits an upsert product entity to shipping offers database.

Figure 22:
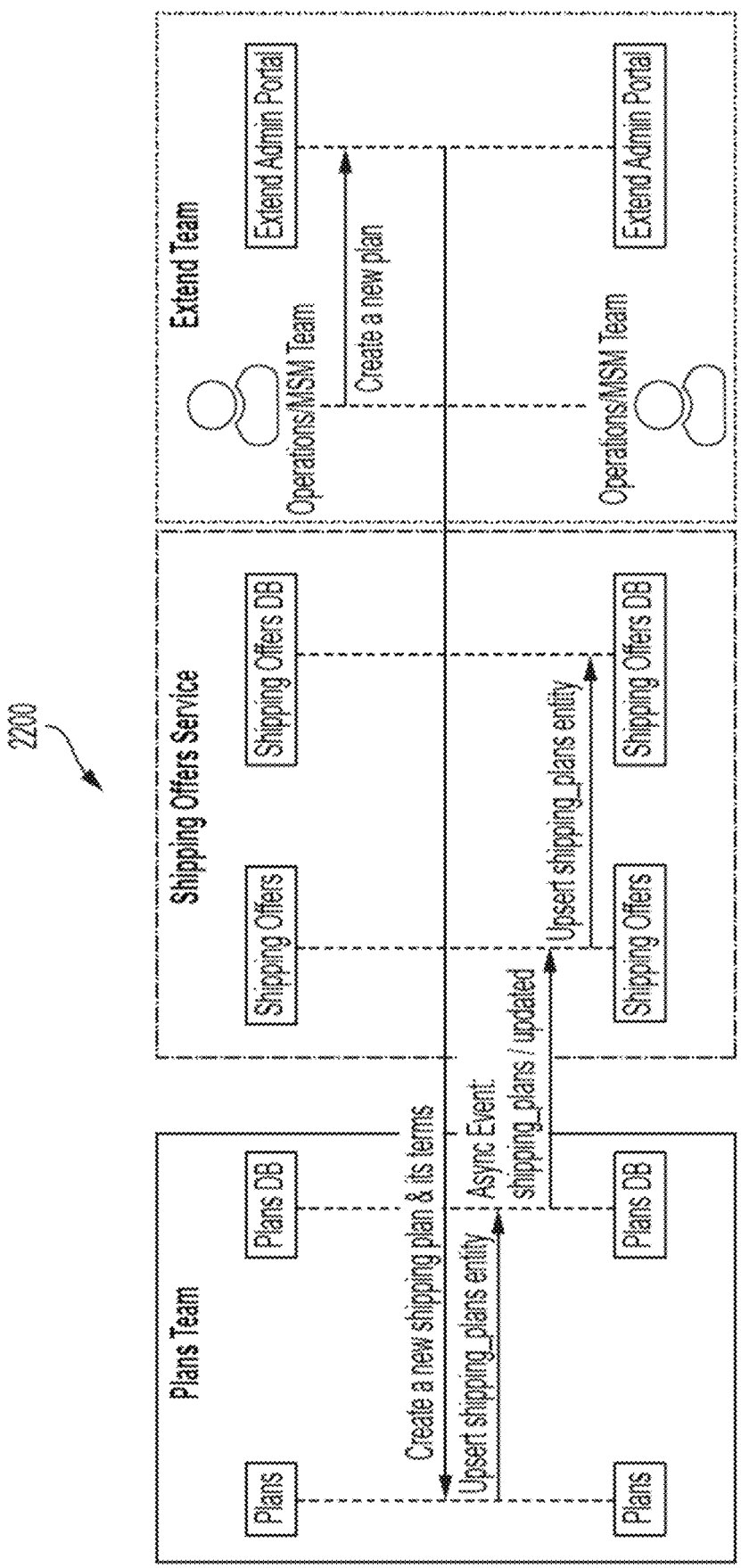
FIG. 22 illustrates another example flow diagram that may be used by an integration system to provide shipping protection offers on a live merchant website.

FIG. 22 illustrates an example flow diagram 2200 that may be used by an integration system to provide shipping protection offers on a live merchant website. Flow diagram 2200 may be particularly utilized for shipping protection plan creation. As illustrated in FIG. 22, plans team, shipping offers service, and extend team communicate. Extend team operations/MSM team create a new plan in extend administration portal. Extend administration portal creates a new shipping plan and its terms with plans team. Plans team transmits an upsert shipping plans entity to plans database. Plans database transmits an async event: shipping plans/updated to shipping offers service. Shipping offers service transmits an upsert shipping plans entity to shipping offers database.

Figure 23:
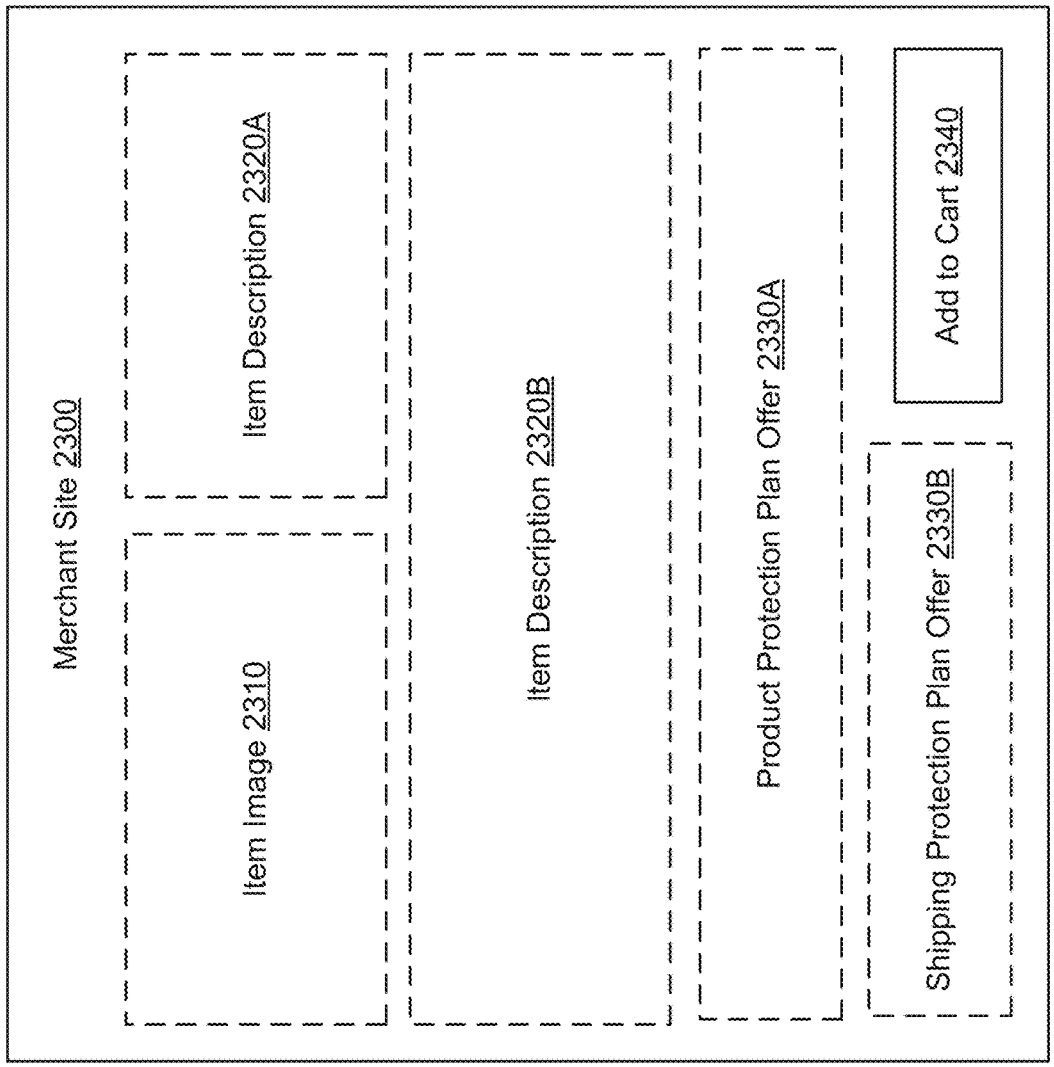
FIG. 23 illustrates an example of a network document associated with a merchant system, in accordance with the embodiments disclosed herein.

An illustrative layout of a network document associated with merchant system 120 is provided with FIG. 23. In this example, merchant site 2300 includes item image 2310, one or more item descriptions 2320 (illustrated as first item description 2320A and second item description 2320B), product protection plan offer 2330A, shipping protection plan offer 2330B, and "add to cart" tool 2340. Either or both of product protection plan offer 2330A and shipping protection plan offer 2330B may be a frame object that is replaceable and updated by integration system 110.

An illustrative example of a network document associated with merchant system 120 is provided with FIG. 24. In this example, merchant site 2400 includes item image 2410, one or more item descriptions 2420 (illustrated as first item description 2420A and second item description 2420B), product protection plan offer 2430A, shipping protection plan offer 2430B, and "continue to checkout" tool 2440.

For example, once the installation steps are completed by the merchant user, one or more product protection plan offers may be provided in a first frame object for display at 2430A. Relatedly, one or more shipping protection plan offers may be provided in a second frame object for display at 2430B. In some examples, the merchant may be authenticated and identify a catalog of items offered by merchant system 120. The items may be synced with integration system 110 and associated with one or more product protection plan offers or shipping protection plan offers. The available product protection plan offers or shipping protection plan offers may be displayed in the storefronts at 2430A and 2430B respectively. The network document may correspond with the Shopping Cart, a Checkout Page, etc. The product protection plan offers and/or shipping protection plan offers may be shown above the "continue to checkout" tool 2440.

Figure 25:
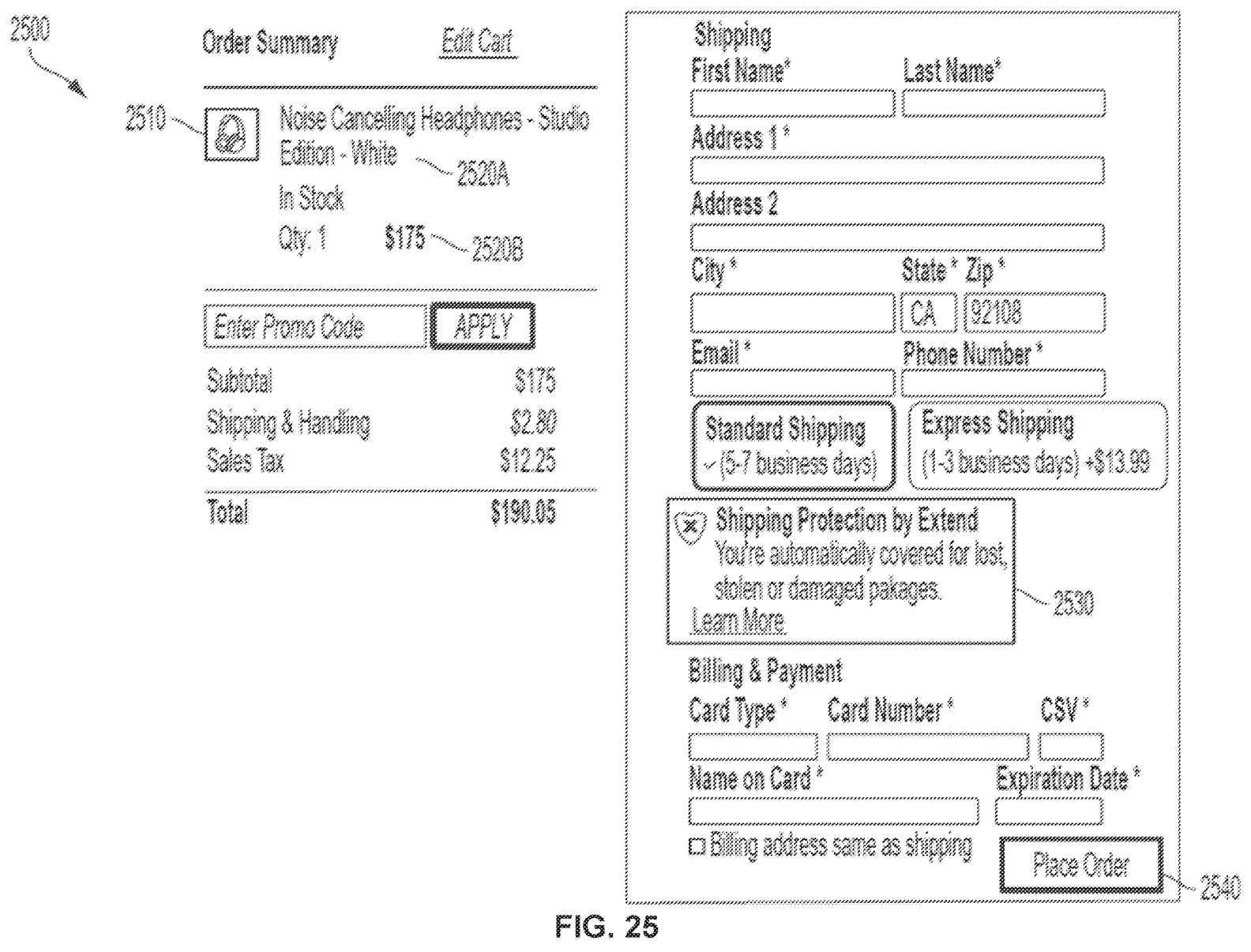

An illustrative example of a network document associated with merchant system 120 is provided with FIG. 25. In this example, merchant site 2500 includes item image 2510, one or more item descriptions 2520 (illustrated as first item description 2520A and second item description 2520B), merchant-included shipping protection plan 2530, and "place order" tool 2540. As alluded to above, a merchant-included shipping protection plan may comprise a shipping protection plan added to every order of an item that a customer cannot add or remove.

In this example, once the installation steps are completed by the merchant user, a merchant-included shipping protection plan may be provided in a first frame object for display at 2530. As depicted, the first frame object may be displayed within, or as part of, a larger frame object related to shipping of the item.

Where components, logical circuits, or engines of the technology are implemented in whole or in part using software, in one embodiment, these software elements can be implemented to operate with a computing or logical circuit capable of carrying out the functionality described with respect thereto. One such example logical circuit is shown in FIG. 19. Various embodiments are described in terms of this example logical circuit 1900. After reading this description, it will become apparent to a person skilled in the relevant art how to implement the technology using other logical circuits or architectures.

Figure 26:
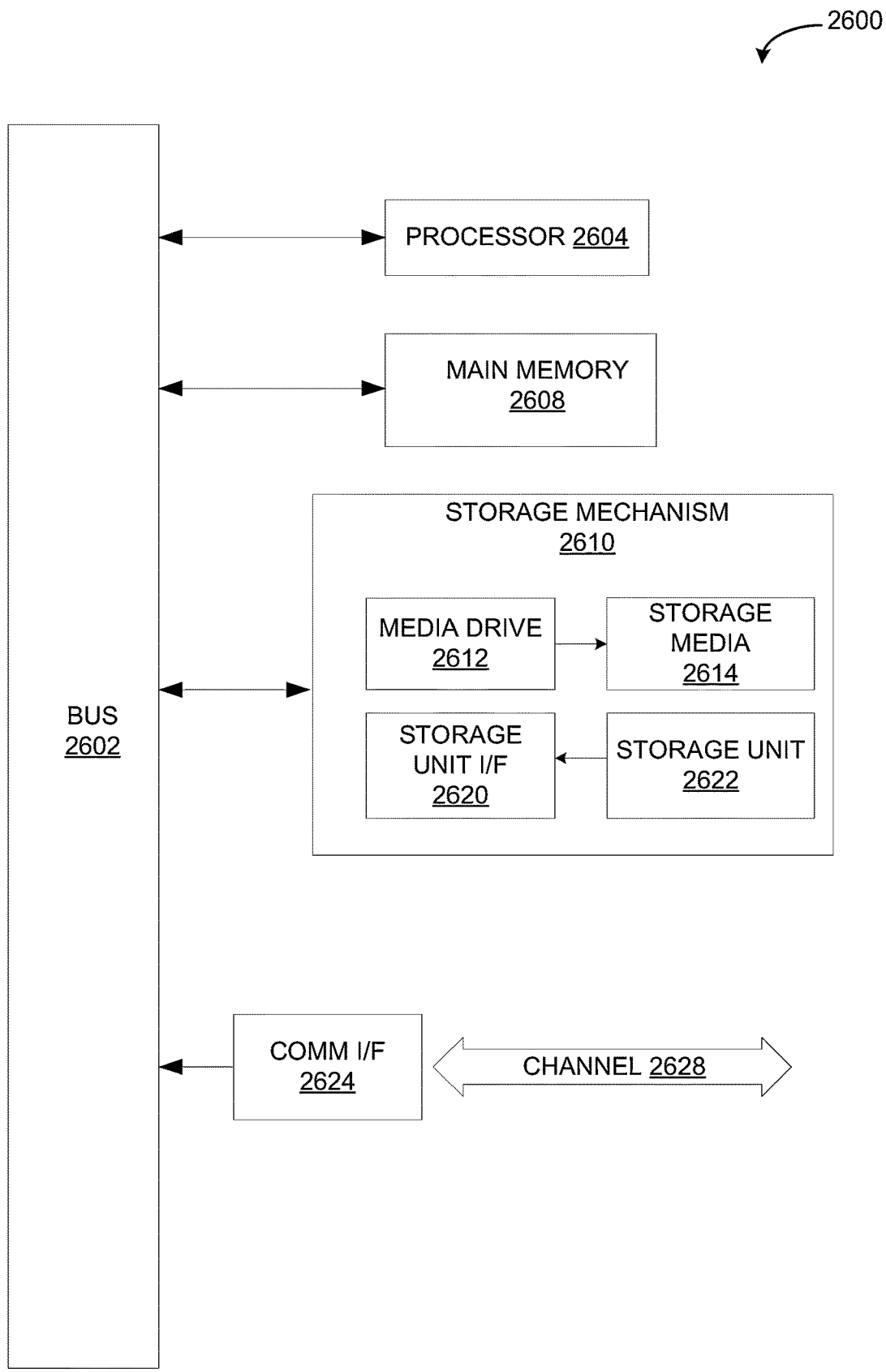
FIG. 26 is an example of a computing system that may be used in implementing various features of embodiments of the disclosed technology.

Referring now to FIG. 26, computing system 2600 may represent, for example, computing or processing capabilities found within desktop, laptop, and notebook computers; hand-held computing devices (PDA's, smart phones, cell phones, palmtops, etc.); mainframes, supercomputers, workstations, or servers; or any other type of special-purpose or general-purpose computing devices as may be desirable or appropriate for a given application or environment. Logical circuit 2600 might also represent computing capabilities embedded within or otherwise available to a given device. For example, a logical circuit might be found in other electronic devices such as, for example, digital cameras, navigation systems, cellular telephones, portable computing devices, modems, routers, WAPs, terminals and other electronic devices that might include some form of processing capability.

Computing system 2600 might include, for example, one or more processors, controllers, control engines, or other processing devices, such as a processor 2604. Processor 2604 might be implemented using a general-purpose or special-purpose processing engine such as, for example, a microprocessor, controller, or other control logic. In the illustrated example, processor 2604 is connected to a bus 2602, although any communication medium can be used to facilitate interaction with other components of logical circuit 2100 or to communicate externally.

Computing system 2600 might also include one or more memory engines, simply referred to herein as main memory 2608. For example, preferably random-access memory (RAM) or other dynamic memory, might be used for storing information and instructions to be executed by processor 2604. Main memory 2608 might also be used for storing temporary variables or other intermediate information during execution of instructions to be executed by processor 2604. Logical circuit 2600 might likewise include a read only memory ("ROM") or other static storage device coupled to bus 2602 for storing static information and instructions for processor 2604.

The computing system 2600 might also include one or more various forms of information storage mechanism 2610, which might include, for example, a media drive 2612 and a storage unit interface 2620. The media drive 2612 might include a drive or other mechanism to support fixed or removable storage media 2614. For example, a hard disk drive, a floppy disk drive, a magnetic tape drive, an optical disk drive, a CD or DVD drive (R or RW), or other removable or fixed media drive might be provided. Accordingly, storage media 2614 might include, for example, a hard disk, a floppy disk, magnetic tape, cartridge, optical disk, a CD or DVD, or other fixed or removable medium that is read by, written to, or accessed by media drive 2612. As these examples illustrate, the storage media 2614 can include a computer usable storage medium having stored therein computer software or data.

In alternative embodiments, information storage mechanism 2610 might include other similar instrumentalities for allowing computer programs or other instructions or data to be loaded into logical circuit 2600. Such instrumentalities might include, for example, a fixed or removable storage unit 2622 and an interface 2620. Examples of such storage units 2622 and interfaces 2620 can include a program cartridge and cartridge interface, a removable memory (for example, a flash memory or other removable memory engine) and memory slot, a PCMCIA slot and card, and other fixed or removable storage units 2622 and interfaces 2620 that allow software and data to be transferred from the storage unit 2622 to logical circuit 2600.

Logical circuit 2600 might also include a communications interface 2624. Communications interface 2624 might be used to allow software and data to be transferred between logical circuit 2600 and external devices. Examples of communications interface 2624 might include a modem or soft modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 2624 might typically be carried on signals, which can be electronic, electromagnetic (which includes optical) or other signals capable of being exchanged by a given communications interface 2624. These signals might be provided to communications interface 2624 via a channel 2628. This channel 2628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 2608, storage unit 2620, media 2614, and channel 2628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the logical circuit 2600 to perform features or functions of the disclosed technology as discussed herein.

Although FIG. 26 depicts a computer network, it is understood that the disclosure is not limited to operation with a computer network, but rather, the disclosure may be practiced in any suitable electronic device. Accordingly, the computer network depicted in FIG. 26 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical, or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of an engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A computer-implemented method for facilitating the dynamic determination and presentation at a point-of-sale of customized shipping protection plan offers related to a first item offered by a merchant, receiving selection of a shipping protection plan, registering the shipping protection plan and facilitating lifecycle management of the selected plan by posing questions to a shopper and processing updates to the shipping protection plan for the first item based on delayed shipping of the first item that delays coverage of the first item associated with the shipping protection plan, the method comprising
   receiving, at an integration system from a merchant system, a first request for a shipping offer configuration and a first quote for the first item in a virtual shopping cart, wherein the shopper browsed an online store, displayed by a live website, associated with the virtual shopping cart and added the first item to the virtual shopping cart at the merchant system by selecting a first interactive interface object on the live website;
   creating, at the integration system, the first quote in part based on:
   determining one or more rules that map a subset of a set of shipping protection plan offers, from the set of shipping protection plan offers, to the first item as a function of at least one of: offer price, merchant, product type, term length, coverage type, service type, region, and subregion, and
   identifying the subset of the set of shipping protection plan offers based on the one or more rules;
   providing, by the integration system, the shipping offer configuration and the first quote with a quote ID, wherein the merchant system displays the first quote at an interactive interface of the live website for the shopper, wherein the live website displays the first item with a first interactive frame object and a second interactive frame object comprising the subset of the set of shipping protection plan offers mapped to the first item;
   receiving, at the integration system from the merchant system, a second request for a second quote in the virtual shopping cart for a second item in addition to the first item, wherein the second request is received based on an interaction with the online store to select a second interactive interface object that adds the second item to the virtual shopping cart;
   creating, at the integration system, the second quote in part based on updating the one or more rules to map an updated subset of shipping protection plan offers to the first item and the second item, and identifying the updated subset of shipping protection plan offers based on the updated one or more rules;
   providing the second quote for the merchant system to display at the interactive interface for the shopper, wherein the second quote is displayed in the live website, wherein the live website updates the second interactive frame object to display the updated subset of shipping protection plan offers;
   receiving, at the integration system, a notification related to a transaction involving the first item, the second item, and the shopper;
   processing the transaction of the first item and the second item, by an orders application programming interface (API) or a contracts API of the integration system, to create a service contract associated with the shipping protection plan, an order date, and a time period of the shipping protection plan, wherein the shipping protection plan is selected from the updated subset of shipping protection plan offers in response to the shopper selecting the second interactive frame object;
   creating a data structure including one or more product reference identifiers associated with at least one of the first item and the second item, and a protection plan identifier associated with the service contract to automatically register the shipping protection plan on behalf of the shopper; and
   in response to determining that the first item or the second item is shipped later than the order date, updating the data structure to update shipping protection plan coverage dates of the service contract for the one or more product reference identifiers and the protection plan identifier, by the orders API or the contracts API of the integration system.

2. The method of claim 1, wherein:
   receiving, at the integration system, a catalog of items and the notification related to the transaction;
   determining, at the integration system, the subset of the set of shipping protection plan offers to display in the live website; and
   performing, at the integration system, an action associated with the transaction.

3. The method of claim 1, further comprising:
   providing, at the integration system, an offers management system that includes a set of connected platforms to manage aspects of the set of shipping protection plan offers.

4. The method of claim 3, wherein the offers management system includes an offers management administrative module, a rules system, an offers API, a content management system, lead tokens, and an offer rendering system.

5. The method of claim 1, wherein one or more of a set of product protection plan offers, the updated subset of shipping protection plan offers, and the subset of the set of shipping protection plan offers are provided natively at the live website associated with the merchant system.

6. The method of claim 1, further comprising:
   generating a first contract associated with the first item, the shopper, and a product protection plan; and
   generating the service contract, wherein the service contract is associated with the first item, the shopper, and the shipping protection plan.

7. The method of claim 1, further comprising at least one of:
   generating a refund associated with the first item, the shopper, and the shipping protection plan; and
   initiating shipment of a replacement product associated with the first item, the shopper, and the shipping protection plan.

8. The method of claim 1, further comprising determining that the first item is eligible for shipping protection.

9. The method of claim 8, wherein determining that the first item is eligible for shipping protection comprises:

determining that the first item is a physical good that can be shipped; and determining that the first item is eligible for coverage under a service provider's policy.

10. The method of claim 1, wherein the subset of the set of shipping protection plan offers is provided in a modal window of the live website that is displayed based on the adding of the first item to the virtual shopping cart.

11. An integration system facilitating determination and presentation at a point-of-sale of customized shipping protection plan offers related to a first item offered by a merchant, receiving selection of a shipping protection plan, registering the shipping protection plan and facilitating lifecycle management of the selected plan by posing questions to a shopper and processing updates to the shipping protection plan for the first item based on delayed shipping of the first item that delays coverage of the first item associated with the shipping protection plan, the integration system comprising:

one or more processors; and a memory operatively connected to the one or more processors, and including computer code that when executed, causes the one or more processors to:

receive, from a merchant system, a first request for a shipping offer configuration and a first quote for the first item in a virtual shopping cart, wherein the shopper browsed an online store, displayed by a live website, associated with the virtual shopping cart and added the first item to the virtual shopping cart at the merchant system by selecting a first interactive interface object on the live website;

create the first quote in part based on;

determining one or more rules that map a subset of a set of shipping protection plan offers, from a set of shipping protection plan offers, to the first item as a function of at least one of: offer price, merchant, product type, term length, coverage type, service type, region, and subregion, and identifying the subset of the set of shipping protection plan offers based on the one or more rules;

provide the shipping offer configuration and the first quote with a quote ID, wherein the merchant system displays the first quote at an interactive interface of the live website for the shopper, wherein the live website displays the first item with a first interactive frame object and a second interactive frame object comprising the subset of the set of shipping protection plan offers mapped to the first item;

receive, from the merchant system, a second request for a second quote in the virtual shopping cart for a second item in addition to the first item, wherein the second request is received based on an interaction with the online store to select a second interactive interface object that adds the second item to the virtual shopping cart;

create the second quote in part based on updating the one or more rules to map an updated subset of shipping protection plan offers to the first item and the second item, and identifying the updated subset of shipping protection plan offers based on the updated one or more rules;

provide the second quote for the merchant system to display at the interactive interface for the shopper, wherein the second quote is displayed in the live website, wherein the live website updates the second interactive frame object to display the updated subset of shipping protection plan offers;

receive a notification related to a transaction involving the first item, the second item, and the shopper;

process the transaction of the first item and the second item, by an orders application programming interface (API) or a contracts API of the integration system, to create a service contract associated with the shipping protection plan, an order date, and a time period of the shipping protection plan, wherein the shipping protection plan is selected from the updated subset of shipping protection plan offers in response to the shopper selecting the second interactive frame object;

create a data structure including one or more product reference identifiers associated with at least one of the first item and the second item, and a protection plan identifier associated with the service contract to automatically register the shipping protection plan on behalf of the shopper; and in response to determining that the first item or the second item is shipped later than the order date, updating the data structure to update shipping protection plan coverage dates of the service contract for the one or more product reference identifiers and the protection plan identifier, by the orders API or the contracts API of the integration system.

12. The integration system of claim 11, wherein the one or more processors are further to:

receive a catalog of items and the notification associated with the transaction;

determine a set of product protection plan offers and the subset of the set of shipping protection plan offers to display in the live website; and perform an action associated with the transaction.

13. The integration system of claim 11, wherein the one or more processors are further to:

provide an offers management system that includes a set of connected platforms to manage aspects of the set of shipping protection plan offers.

14. The integration system of claim 13, wherein the offers management system includes an offers management administrative module, a rules system, an offers API, a content management system, lead tokens, and an offer rendering system.

15. The integration system of claim 11, wherein a data object for the first item is displayed on the live website that associates the first item with a catalog of items of the merchant.

16. The integration system of claim 11, wherein one or more of the subset of the set of shipping protection plan offers and the updated subset of shipping protection plan offers are provided natively at the live website associated with the merchant.

17. The integration system of claim 11, wherein the one or more processors are further to:

generate a first contract associated with the first item, the shopper, and a product protection plan; and generate the service contract, wherein the service contract is associated with the first item, the shopper, and the shipping protection plan.

18. The integration system of claim 11, wherein the one or more processors are further to perform at least one of:

generate a refund associated with the first item, the shopper, and the shipping protection plan; and initiate shipment of a replacement product associated with the first item, the shopper, and the shipping protection plan.

19. A non-transitory computer-readable medium for facilitating determination and presentation at a point-of-sale of customized shipping protection plan offers related to a first item offered by a merchant, receiving selection of a shipping protection plan, and registering the shipping protection plan and facilitating lifecycle management of the selected plan by posing questions to a shopper and processing updates to the shipping protection plan for the first item based on delayed shipping of the first item that delays coverage of the first item associated with the shipping protection plan, wherein the non-transitory computer-readable medium stores instructions, which when executed by one or more processing resources of an integration system, cause the one or more processing resources to:

receive, from a merchant system, a first request for a shipping offer configuration and a first quote for the first item in a virtual shopping cart, wherein the shopper browsed an online store, displayed by a live website, associated with the virtual shopping cart and added the first item to the virtual shopping cart at the merchant system by selecting a first interactive interface object on the live website;

create the first quote in part based on;

determining one or more rules that map a subset of a set of shipping protection plan offers, from the set of shipping protection plan offers, to the first item as a function of at least one of: offer price, merchant, product type, term length, coverage type, service type, region, and subregion, and identifying the subset of the set of shipping protection plan offers based on the one or more rules;

provide the shipping offer configuration and the first quote with a quote ID, wherein the merchant system displays the first quote at an interactive interface of the live website for the shopper, wherein the live website displays the first item with a first interactive frame object and a second interactive frame object comprising the subset of the set of shipping protection plan offers mapped to the first item;

receive, from the merchant system, a second request for a second quote in the virtual shopping cart for a second item in addition to the first item, wherein the second request is received based on an interaction with the online store to select a second interactive interface object that adds the second item to the virtual shopping cart;

create the second quote in part based on updating the one or more rules to map an updated subset of shipping protection plan offers to the first item and the second item, and identifying the updated subset of shipping protection plan offers based on the updated one or more rules;

provide the second quote for the merchant system to display at the interactive interface for the shopper, wherein the second quote is displayed in the live website, wherein the live website updates the second interactive frame object to display the updated subset of shipping protection plan offers;

receive a notification associated with a transaction involving the first item, the second item, and the shopper;

process the transaction of the first item and the second item, by an orders application programming interface (API) or a contracts API of the integration system, to create a service contract associated with the shipping protection plan, an order date, and a time period of the shipping protection plan, wherein the shipping protection plan is selected from the updated subset of shipping protection plan offers in response to the shopper selecting the second interactive frame object;

create a data structure including one or more product reference identifiers associated with at least one of the first item and the second item, and a protection plan identifier associated with the service contract to automatically register the shipping protection plan on behalf of the shopper; and in response to determining that the first item or the second item is shipped later than the order date, updating the data structure to update shipping protection plan coverage dates of the service contract for the one or more product reference identifiers and the protection plan identifier, by the orders API or the contracts API of the integration system.

20. The non-transitory computer-readable medium storing instructions of claim 19, wherein the one or more processing resources are further caused to:

receive a catalog of items and the notification associated with the transaction;

determine a set of product protection plan offers and the subset of the set of shipping protection plan offers to display in a live website associated with the merchant; and perform an action associated with the transaction.

* * * * *

UNITED STATES PATENT AND TRADEMARK OFFICE
CERTIFICATE OF CORRECTION

| | | |
|---|---|---|
| PATENT NO. | : 12,154,164 B2 | Page 1 of 1 |
| APPLICATION NO. | : 18/193788 | |
| DATED | : November 26, 2024 | |
| INVENTOR(S) | : Woodrow Horwitz Levin et al. | |

It is certified that error appears in the above-identified patent and that said Letters Patent is hereby corrected as shown below:

In the Claims

Column 27, Line 32 (Claim 11), change "based on;" to --based on:--; and

Column 29, Line 21 (Claim 19), change "based on;" to --based on:--.

Signed and Sealed this
Fourteenth Day of January, 2025

Derrick Brent
*Acting Director of the United States Patent and Trademark Office*